(12) United States Patent
Furukawa et al.

(10) Patent No.: US 7,971,011 B2
(45) Date of Patent: Jun. 28, 2011

(54) REMOTE COPY METHOD AND STORAGE SYSTEM

(75) Inventors: Hiroshi Furukawa, Kawasaki (JP); Hiroshi Okamoto, Nagoya (JP)

(73) Assignee: Fujitsu Limited, Kawasaki (JP)

( * ) Notice: Subject to any disclaimer, the term of this patent is extended or adjusted under 35 U.S.C. 154(b) by 341 days.

(21) Appl. No.: 11/184,870

(22) Filed: Jul. 20, 2005

(65) Prior Publication Data

US 2006/0212668 A1 Sep. 21, 2006

(30) Foreign Application Priority Data

Mar. 17, 2005 (JP) ................................. 2005-078014

(51) Int. Cl.
*G06F 12/00* (2006.01)
(52) U.S. Cl. ........ 711/161; 711/151; 711/154; 711/162; 707/658; 707/660; 710/53; 710/57; 710/59
(58) Field of Classification Search .................... 711/161
See application file for complete search history.

(56) References Cited

U.S. PATENT DOCUMENTS

| | | | | |
|---|---|---|---|---|
| 5,289,470 | A * | 2/1994 | Chang et al. .................. | 711/173 |
| 5,509,122 | A * | 4/1996 | Bartow et al. ................. | 709/227 |
| 5,805,821 | A | 9/1998 | Saxena et al. | |
| 6,173,377 | B1 * | 1/2001 | Yanai et al. ................... | 711/162 |
| 6,549,920 | B1 | 4/2003 | Obara et al. | |
| 6,792,557 | B1 | 9/2004 | Takamoto et al. | |
| 6,851,020 | B2 | 2/2005 | Matsumoto et al. | |
| 6,895,417 | B2 | 5/2005 | Obara et al. | |
| 7,127,568 | B2 * | 10/2006 | Watanabe et al. ............. | 711/154 |
| 7,171,517 | B2 * | 1/2007 | Muto et al. .................... | 711/113 |
| 7,191,198 | B2 | 3/2007 | Asano et al. | |
| 7,398,367 | B2 | 7/2008 | Matsumoto et al. | |
| 7,483,928 | B2 | 1/2009 | Asano et al. | |
| 2003/0200387 | A1 * | 10/2003 | Urabe et al. .................. | 711/113 |
| 2004/0260972 | A1 * | 12/2004 | Ji et al. .......................... | 714/11 |
| 2005/0080874 | A1 * | 4/2005 | Fujiwara et al. .............. | 709/217 |
| 2008/0263111 | A1 | 10/2008 | Asano et al. | |
| 2008/0263273 | A1 | 10/2008 | Matsumoto et al. | |

FOREIGN PATENT DOCUMENTS

| | | |
|---|---|---|
| JP | 8-130714 | 5/1996 |
| JP | 11-085594 | 3/1999 |
| JP | 11-282641 | 10/1999 |
| JP | 2000-347917 | 12/2000 |
| JP | 2002-259063 | 9/2002 |
| JP | 2003-167684 | 6/2003 |
| JP | 2003167684 A * | 6/2003 |
| JP | 2004-334574 | 11/2004 |

OTHER PUBLICATIONS

Allman et al., TCP Congestion Control, Apr. 1999, pp. 1-14.
Japanese Office Action issued on Jan. 20, 2009 in corresponding Japanese Patent Application 2005-078014.

* cited by examiner

*Primary Examiner* — Kevin L Ellis
*Assistant Examiner* — Kalpit Parikh
(74) *Attorney, Agent, or Firm* — Staas & Halsey LLP

(57) ABSTRACT

A remote copy method for copying data within a first storage apparatus to a second storage apparatus via a network, includes transmitting data from the first storage apparatus in units of first buffer sets each formed by a plurality of first recording exclusive buffers within the first storage apparatus, and receiving the data by the second storage apparatus in units of second buffer sets each formed by a plurality of second recording exclusive buffers within the second storage apparatus, so as to maintain a sequence guarantee with respect to the data that is copied.

9 Claims, 18 Drawing Sheets

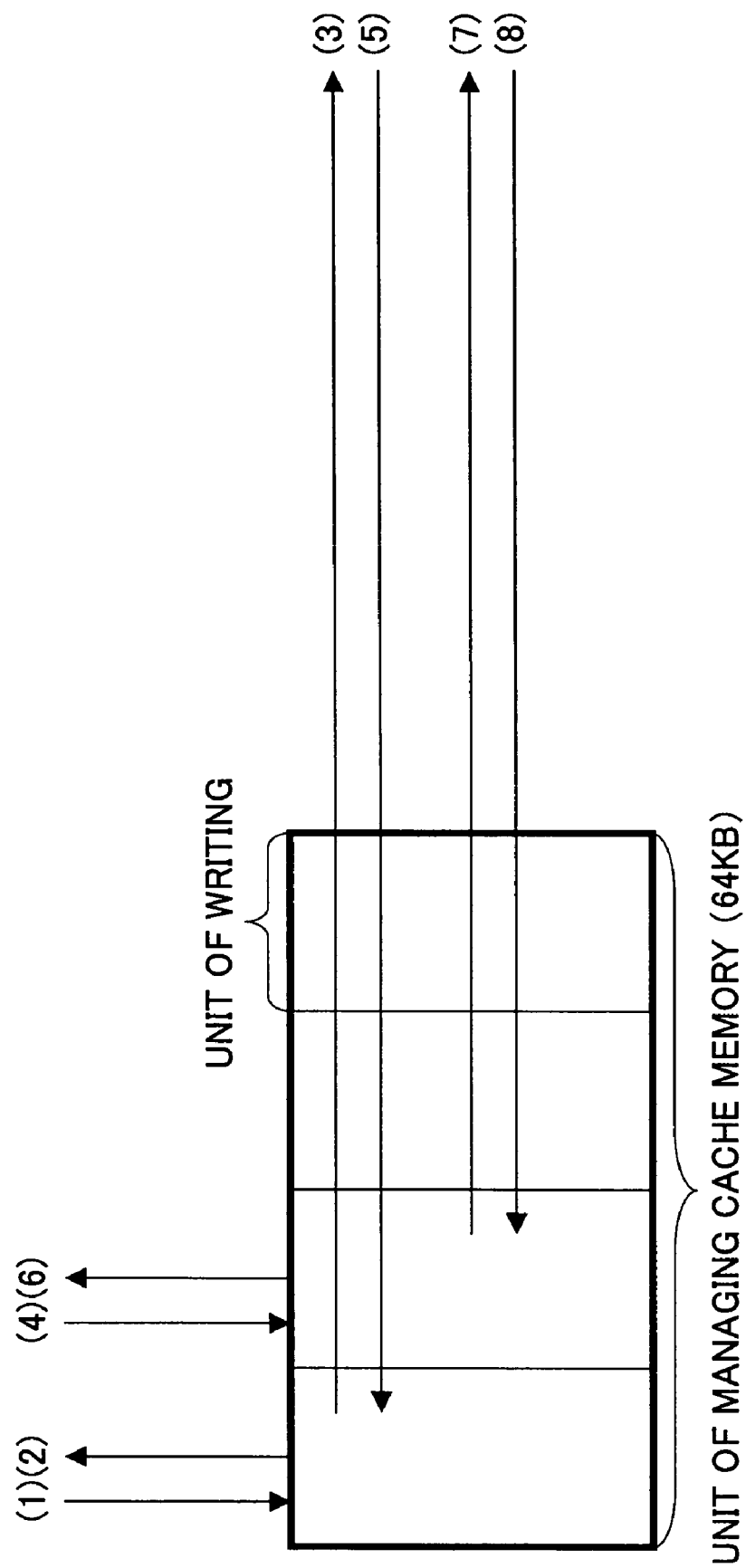

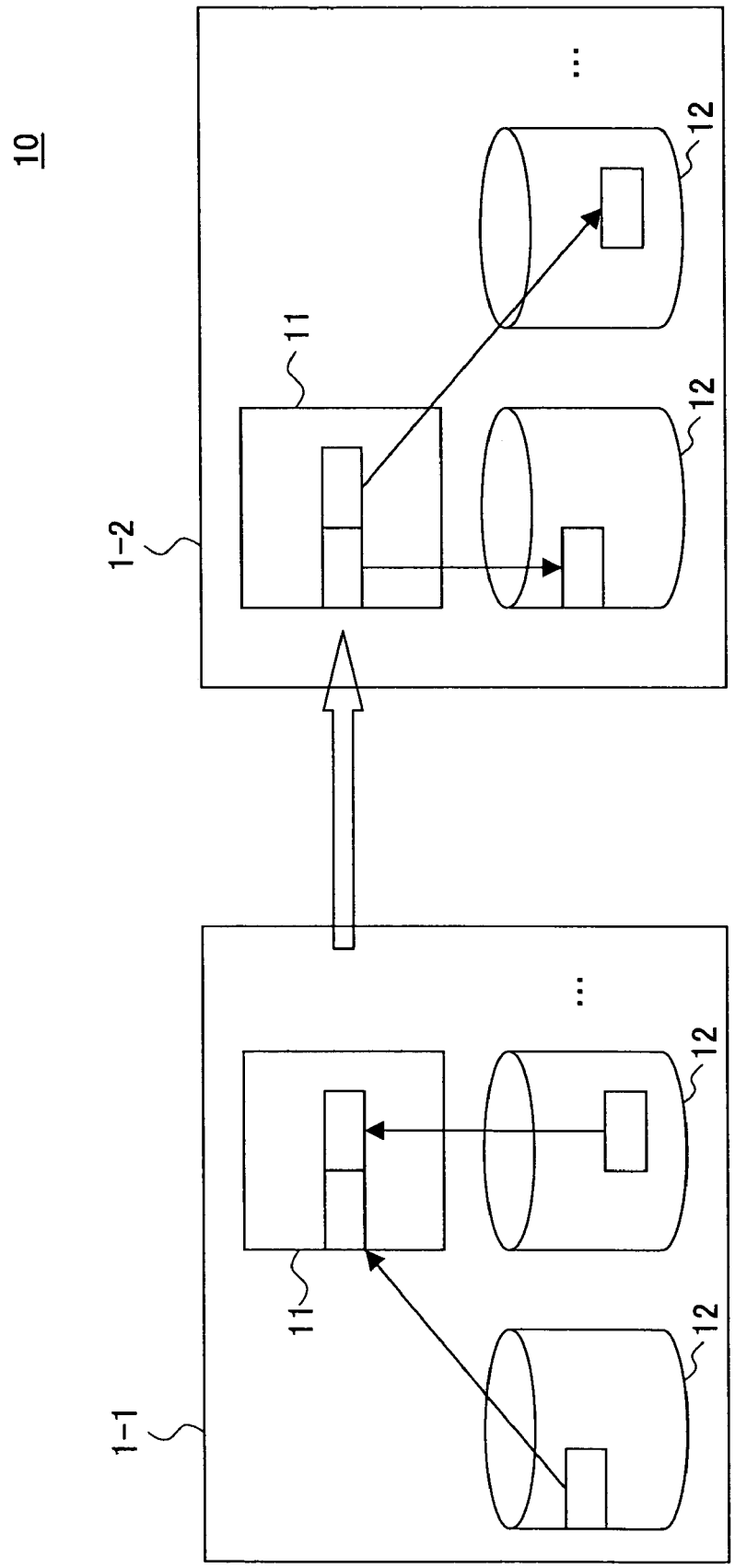

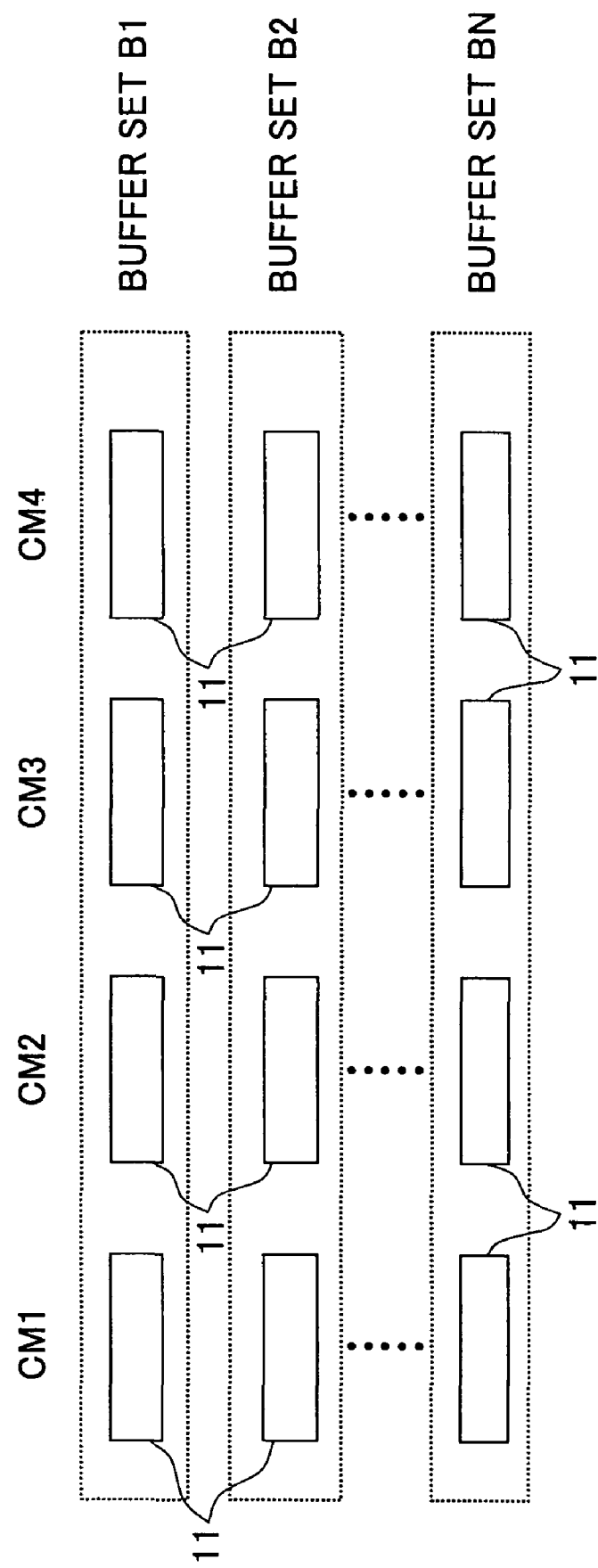

FIG.4

| TYPE | STATE | DESCRIPTION OF STATE |
|---|---|---|
| COPY SOURCE | SET STORE STATE | STATE WHERE COPY DATA THAT IS WRITTEN IS ACTUALLY STORED |
| | SET EXTRACT STATE | STATE WHERE, OF COPY DATA THAT IS WRITTEN, COPY DATA FOR WHICH THE ACTUAL STORING IS NOT COMPLETED IS STORED |
| | SET TRANSFER STATE | STATE WHERE COPY DATA IS BEING TRANSFERRED FROM RECORDING EXCLUSIVE BUFFER |
| COPY DESTINATION | SET RECEPTION STATE | STATE WHERE RECORDING EXCLUSIVE BUFFER IS RECEIVING COPY DATA |
| | SET RECEPTION COMPLETE STATE | STATE WHERE RECEPTION OF COPY DATA IS COMPLETED BY RECORDING EXCLUSIVE BUFFER & COPY DATA CAN BE DEVELOPED |
| | SET DEVELOPING COMPLETE STATE | STATE WHERE DEVELOPING OF COPY DATA FROM RECORDING EXCLUSIVE BUFFER IS COMPLETED & BUFFER SET PROCESS CAN BE COMPLETED |
| COPY SOURCE | SET COMPLETE STATE | STATE WHERE COMPLETION OF DEVELOPING OF COPY DATA FROM RECORDING EXCLUSIVE BUFFER IS NOTIFIED FROM COPY DESTINATION |

RECORDING EXCLUSIVE
BUFFER

BUFFER SWITCHING

RECORDING EXCLUSIVE
BUFFER

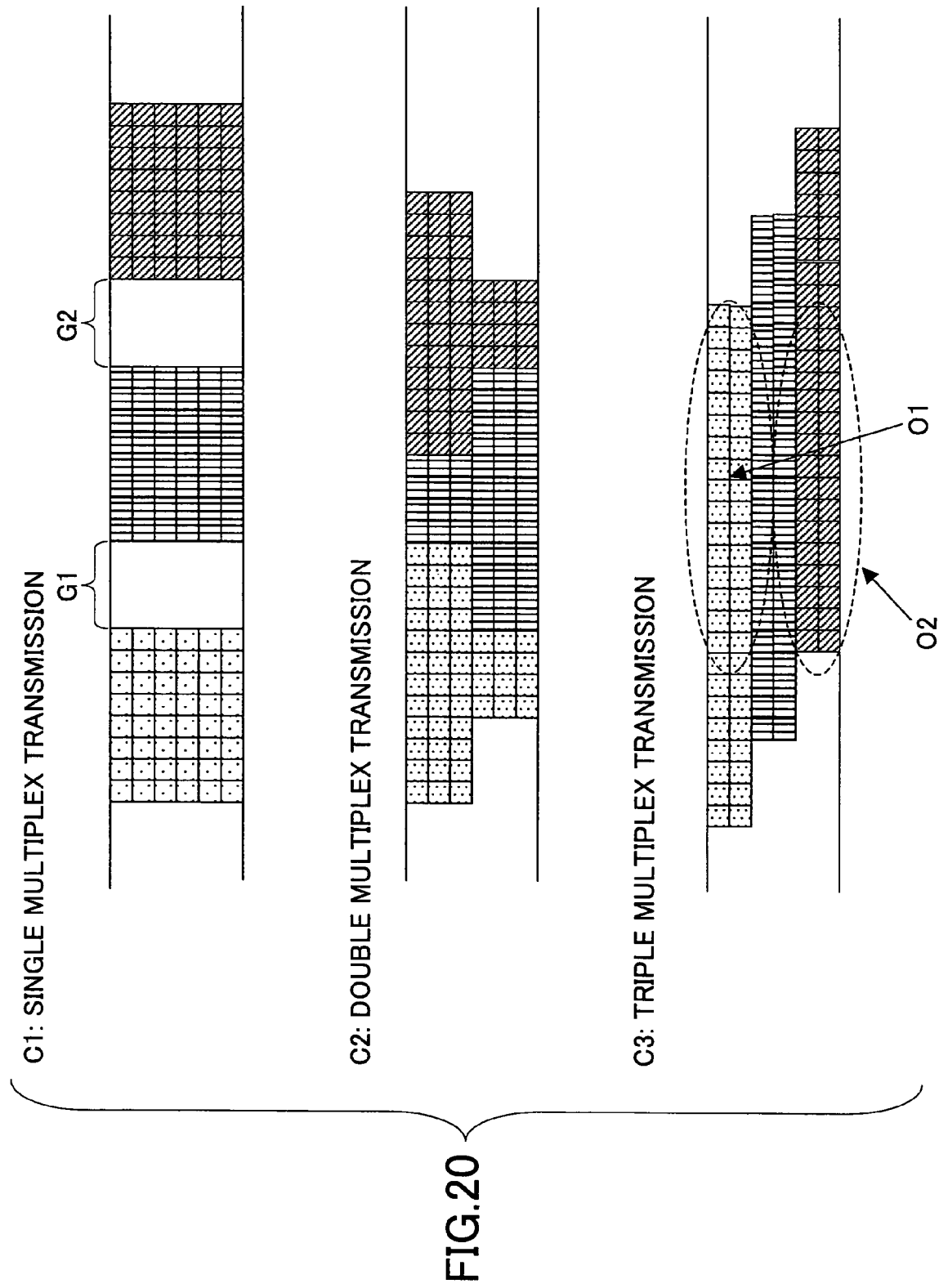

REMOTE COPY METHOD AND STORAGE SYSTEM

CROSS-REFERENCE TO RELATED APPLICATIONS

This application claims the benefit of a Japanese Patent Application No. 2005-078014 filed Mar. 17, 2005, in the Japanese Patent Office, the disclosure of which is hereby incorporated by reference.

BACKGROUND OF THE INVENTION

1. Field of the Invention

The present invention generally relates to remote copy methods and storage systems, and more particularly to a remote copy method for carrying out an asynchronous copy having a sequence guarantee and to a storage system which employs such a remote copy method.

2. Description of the Related Art

Normally a cache memory is provided in a storage system, and methods of realizing the cache memory may be roughly categorized into two methods. According to one method, the cache memory is shared by all controller modules. On the other hand, according to the other method, the cache memory is distributed and held for each of the controller modules. The present invention relates to a storage system employing the latter architecture.

In a distributed cache memory type storage system, read and write processes with respect to data of logical volumes can be carried out distributively for each of the controller modules, thereby enabling the load on the hardware to be distributed and the scalability to be improved. However, in a process that requires linking among the controller modules, the controller modules must communicate with each other, and the control consequently becomes complex.

1.1 Remote Copy Sequence Guarantee:

In the storage system such as a database system, a recovery function is provided to restore files within a database even if the writing to a recording medium such as a disk drive is suddenly stopped due to crashing of an Operating System (OS) of a server, for example, by self-controlling the write sequence to the disk. In a mirroring of the database utilizing a remote copy, even if a copy operation is suddenly stopped due to some reason, a state of the disk at a copy destination becomes the same as when the database suddenly stops the writing, and thus, the files of the database may be recovered at the copy destination by using the recovery function of the storage system.

In a general storage system, the files of the database are in many cases recorded on a plurality of disks, so as to improve the performance and reliability of the storage system, and the same holds true in the case of the mirroring of the database. Accordingly, in the copy function of the storage in the storage system, it is required for the copy of the files of all of the databases to be carried out in the same sequence as the write sequence.

In the case of a synchronous copy mode, the copy is carried out in synchronism with the write, and the above described requirement is satisfied. However, in the case of the mirroring between remote locations, employing the synchronous copy mode introduces problems in that the synchronous copy mode is affected by delays caused by transmission paths, and it is necessary to employ an asynchronous copy mode which is less affected by the delays caused by the transmission paths. But I the asynchronous copy mode of the conventional storage system, the sequence guarantee is only provided with respect to a single copy session. For this reason, in order for the mirroring of the database to be made, there was a problem in that all of the files of the database that need to be transferred must be forcibly stored in a single disk. Hence, there were demands to enable the copy by providing the sequence guarantee among a plurality of disks (copy sessions).

1.2 Sequential Write Performance of Copy Source:

On the other hand, in the conventional storage system, the data transfer to the copy destination is carried out in units with which the write from the host unit is carried out. But since the write process from the host unit and the copy process must be carried out exclusively, a behavior similar to that in the case of the synchronous mode is generated. FIG. 1 is a diagram for generally explaining the write process and the copy process of the storage system in this case. In FIG. 1, a bold solid line on the outer side indicates a memory of a minimum unit (for example, 64 KB) managed by a cache memory, and a thin solid line on the inner side indicates that a write access is made with a size of 64 KB or less by dividing a region of 64 KB. Vertical arrows represent the write process, and horizontal arrows represent the copy process.

In a state where no problems are introduced in the sequential write performance, a write (1) and a response (2) of a write process [(1), (2)] can be completed immediately, as shown in FIG. 1. A copy (3) of a copy process [(3), (5)] is carried out after the write process (1), (2) is completed. If a write (4) of a write process [(4), (6)] is generated immediately after the copy (3) of the copy process [(3), (5)], a response (6) of the write process [(4), (6)] is put on an exclusive wait since the copy process [(3), (5)] with respect to the preceding write process [(1), (2)] is carried out. For this reason, the response (6) of the write process [(4), (6)] is put on an exclusive wait until the response (5) of the copy process [(3), (5)] is received. As a result, a time of the copy process is added during the write process, and the sequential write performance in a worst case becomes the same as that for the synchronous copy.

If only the sequential write performance is the problem, it is conceivable to take measures to intentionally delay the copy process, such as carrying out the copy (3) of the copy process [(3), (5)] after the write process [(4), (6)]. But if an attempt is made to cope with a write process that makes access to the same region as the write (1) of the write process [(1), (2)], it is basically impossible to eliminate the need for the exclusive control unless the written data is saved to another location.

1.3 Transfer Efficiency:

In the conventional storage system, the copy process is carried out in the units with which the write process is carried out. Hence, in the case of the write process in units of 8 KB, for example, the copy process is carried out in units of 8 KB. Such a copy process does not introduce problems when a latency of the transmission path is small, but when using a transmission path having a delay of approximately 300 msec one-way as in the case between Japan and the United Kingdom, for example, it would take approximately 1.2 sec to transfer 8 KB of data. In terms of throughput, this corresponds to approximately 6.5 KB/sec. Accordingly, in the storage system that carries out the copy process in units with which the write process is carried out, it would be necessary to manage approximately 16,000 copy processes if the transfer throughput of 100 MB/sec were to be realized, thereby causing a breakdown from the point of view of managing the resources within the storage system. This is not yet a problem in the environments in which the storage systems are presently used, but it is expected that it will become difficult to support connections between two distant locations in the future.

The applicants are aware of the Japanese Laid-Open Patent Application No. 2003-167684.

As described above, there were demands to provide the sequence guarantee in the conventional storage systems so that the copy can be carried out among a plurality of disks (among copy sessions) while being guaranteed of the sequence.

However, if an attempt is made to satisfy such demands in the distributed cache memory type storage systems, it becomes necessary to communicate among the controller modules for every write process, in order to provide the sequence guarantee. As a result, there was a problem in that an overhead becomes large. In addition, because the sequence is managed in a specific controller module, there was a problem in that the load is concentrated on the specific controller module.

Moreover, in the conventional storage systems, since the data transfer to the copy destination is carried out in units with which the write from the host unit is carried out, the time of the copy process is added during the write process. Consequently, there was a problem (that is, problem related to the sequential write performance of the copy source) in that the sequential write performance of the copy source in the worst case becomes the same as that for the synchronous copy.

Furthermore, in the storage systems in which the copy process is carried out in the units with which the write process is carried out, it would be necessary to manage approximately 16,000 copy processes if the transfer throughput of 100 MB/sec were to be realized, thereby causing a breakdown from the point of view of managing the resources within the storage systems. Thus, there was a problem (that is, problem related to transfer efficiency) in that it will become difficult to support connections between two distant locations in the future.

SUMMARY OF THE INVENTION

Accordingly, it is a general object of the present invention to provide a novel and useful remote copy method and storage system, in which the problems described above are suppressed.

Another and more specific object of the present invention is to provide a remote copy method and a storage system, that can realize the demands with respect to the sequence guarantee (that is, to maintain advantages of the scalability of the distributed cache memory type storage system while carrying out a remote copy with guaranteed sequence) and/or, eliminate at least one of the problem related to the sequential write performance of the copy source and the problem related to the transfer efficiency.

Still another object of the present invention is to provide a remote copy method for copying data within a first storage apparatus to a second storage apparatus via a network, comprising the steps of (a) storing data of at least one first recording medium of a copy source to at least one first recording exclusive buffer, within the first storage apparatus; (b) transmitting the data within the at least one first recording exclusive buffer in an integrated manner to the second storage apparatus when the at least one first recording exclusive buffer becomes full or a predetermined time elapses from the storing of the data to the at least one first recording exclusive buffer, within the first storage apparatus; (c) storing received data to at least one second recording exclusive buffer, within the second storage apparatus; and (d) developing the data within the at least one second recording exclusive buffer to at least one second recording medium of a copy destination in an integrated manner when receiving of the data is completed, within the second storage apparatus. According to the remote copy method of the present invention, it is possible to realize the demands with respect to the sequence guarantee (that is, to maintain advantages of the scalability of the distributed cache memory type storage system while carrying out a remote copy with guaranteed sequence) and/or, eliminate at least one of the problem related to the sequential write performance of the copy source and the problem related to the transfer efficiency.

A further object of the present invention is to provide a storage system comprising a first storage apparatus including at least one control module, at least one first recording medium and at least one first recording exclusive buffer; and a second storage apparatus, connectable to the first storage apparatus via a network, and including at least one second control module, at least one second recording medium and at least one second recording exclusive buffer, wherein data within the first storage apparatus being copied to the second storage apparatus via the network, the first control module stores data of the at least one first recording medium of a copy source to the at least one first recording exclusive buffer, and transmits the data within the at least one first recording exclusive buffer in an integrated manner to the second storage apparatus when the at least one first recording exclusive buffer becomes full or a predetermined time elapses from the storing of the data to the at least one first recording exclusive buffer, and the second control module stores received data to the at least one second recording exclusive buffer, and develops the data within the at least one second recording exclusive buffer to at least one second recording medium of a copy destination in an integrated manner when receiving of the data is completed. According to the storage system of the present invention, it is possible to realize the demands with respect to the sequence guarantee (that is, to maintain advantages of the scalability of the distributed cache memory type storage system while carrying out a remote copy with guaranteed sequence) and/or, eliminate at least one of the problem related to the sequential write performance of the copy source and the problem related to the transfer efficiency.

Another object of the present invention is to provide a remote copy method for copying data within a first storage apparatus to a second storage apparatus via a network, comprising the steps of (a) transmitting data from the first storage apparatus in units of first buffer sets each formed by a plurality of first recording exclusive buffers within the first storage apparatus; and (b) receiving the data by the second storage apparatus in units of second buffer sets each formed by a plurality of second recording exclusive buffers within the second storage apparatus, so as to maintain a sequence guarantee with respect to the data that is copied. According to the remote copy method of the present invention, it is possible to realize the demands with respect to the sequence guarantee (that is, to maintain advantages of the scalability of the distributed cache memory type storage system while carrying out a remote copy with guaranteed sequence) and/or, eliminate at least one of the problem related to the sequential write performance of the copy source and the problem related to the transfer efficiency.

Still another object of the present invention is to provide a storage system comprising a first storage apparatus including at least one control module, at least one first recording medium and at least one first recording exclusive buffer; and a second storage apparatus, connectable to the first storage apparatus via a network, and including at least one second control module, at least one second recording medium and at least one second recording exclusive buffer, wherein data within the first storage apparatus being copied to the second storage apparatus via the network, the first control module transmits data from the first storage apparatus in units of first buffer sets each formed by a plurality of first recording exclusive buffers within the first storage apparatus; and the second control module receives the data by the second storage apparatus in units of second buffer sets each formed by a plurality of second recording exclusive buffers within the second storage apparatus, so as to maintain a sequence guarantee with respect to the data that is copied. According to the storage system of the present invention, it is possible to realize the demands with respect to the sequence guarantee (that is, to maintain advantages of the scalability of the distributed cache memory type storage system while carrying out a remote copy with guaranteed sequence) and/or, eliminate at least one of the problem related to the sequential write performance of the copy source and the problem related to the transfer efficiency.

Other objects and further features of the present invention will be apparent from the following detailed description when read in conjunction with the accompanying drawings.

BRIEF DESCRIPTION OF THE DRAWINGS

FIG. 1 is a diagram for generally explaining a write process and a copy process of a database system;

FIG. 2 is a diagram for explaining an integrated sending system;

FIG. 3 is a diagram for explaining a buffer set control;

FIG. 4 is a table for explaining states of buffer sets;

FIG. 20 is a diagram for explaining an optimization of transfer multiplicity.

DESCRIPTION OF THE PREFERRED EMBODIMENTS

Figure 5:
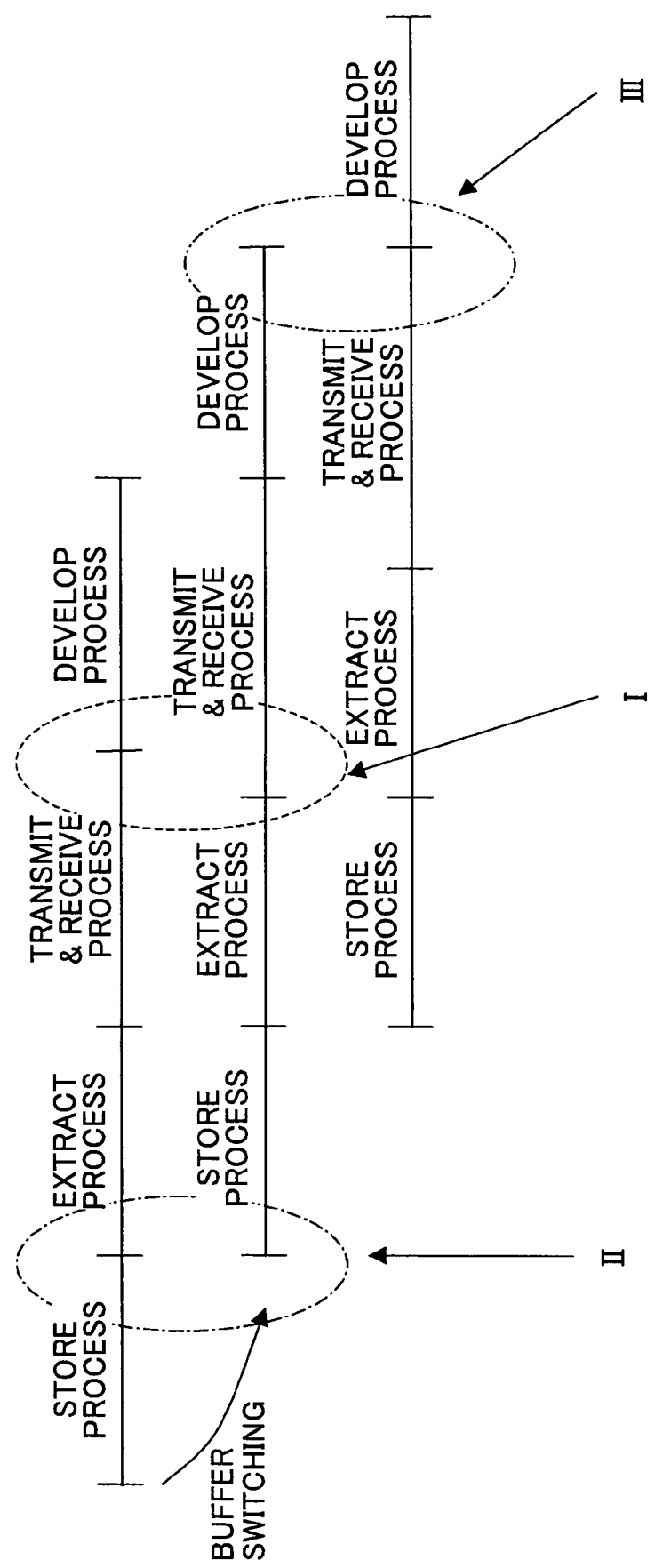
FIG. 5 is a diagram for explaining a buffer set overlap process.

In the present invention, a remote copy is carried out in the following manner in order to guarantee the sequence of the remote copy while maintaining the advantages of the scalability of the distributed cache memory type storage system.

First, a buffer for storing data to be copied is provided in each controller module. The data that is written is not directly stored in the buffer, and only information indicating a region where the data is written is held. After the write is completed, the data is read from a recording medium such as a disk at an arbitrary timing and stored in the buffer. When the buffer becomes full in one of the controller modules or a predetermined time elapses from the first store, the store with respect to all of the controller modules is simultaneously stopped temporarily, so as to make definite a group of data to be copied. After the group of data is made definite, the buffer is switched in all of the controller modules so as to continue the store process with respect to a new buffer. The group of data that is made definite is transferred to a copy destination. At the copy destination, the data is developed after a previous group of data created at a copy source is received in its entirety. Measures are taken so that this process is not interrupted except in case of a fatal abnormality such as a situation where the copy process cannot be continued. By carrying out this process, it is possible to realize the sequence guarantee of the data at the time when the store to all of the controller modules is simultaneously stopped. In addition, the remote copy with the guaranteed sequence can be realized without the need to communicate among the controller modules for every write.

Next, a description will be given of embodiments of a remote copy method and a storage system according to the present invention, by referring to FIG. 2 and the subsequent figures.

First, a description will be given of (2.1) an integrated sending system, (2.2) a buffer set control, (2.3) a buffer set overlap process, (2.4) remote location adapting sequence, (2.5) a recording exclusive buffer, (2.6) write, store and extract processes, and (2.7) a buffer switch that are employed in an embodiment of the remote copy method and the storage system according to the present invention.

2.1 Integrated Sending System:

FIG. 2 is a diagram for explaining an integrated sending system. In a storage system 10 of the present invention, during a consistency mode that guarantees data consistency, a recording exclusive buffer (that is, buffer exclusively for recording) 11 is used when transferring a copy data from a first storage apparatus 1-1 at a copy source shown in FIG. 2 to a second storage apparatus 1-2 at a copy destination. In other words, the copy data is not successively transferred from the copy source to the copy destination, but instead, the copy data is temporarily stored in the recording exclusive buffer 11 from a recording medium 12 such as a disk at the copy source.

At the copy source, the copy data is integrated (or gathered) and transferred to the recording exclusive buffer 11 of the copy destination, when the recording exclusive buffer 11 of the copy source becomes full or after a predetermined time elapses from the store of the copy data. At the copy destination, the received copy data is not immediately reflected to the region of the recording medium 12, but the completion of the reception of the copy data is waited at the recording exclusive buffer 11 of the copy destination. Hence, at the copy destination, the copy data is developed in the recording medium 12 at the copy destination after storing all of the copy data in the recording exclusive buffer 11 of the copy destination. When the developing of the copy data is completed at the copy destination, a developing complete notification is made to the copy source, and the copy data at the copy destination is released. In order to enable the series of processes to be carried out without interruption, a plurality of recording exclusive buffers 11 are provided and a pipeline operation is carried out.

If the copy data that is written with respect to the recording exclusive buffer 11 is actually stored immediately in the recording exclusive buffer 11, the performance of the write process will deteriorate because the store process and the next write process will interfere with each other. Accordingly, in the present invention, the write process and the store process are completely separated, so as not to generate the interference between the store process and the next write process.

In the write process, only the information related to the copy data that is to be stored is stored in a buffer index table within the recording exclusive buffer 11, and no copy process is carried out. In the store process, a reference is made to this buffer index table, and the copy data is actually stored in the recording exclusive buffer 11.

2.2 Buffer Set Control:

FIG. 3 is a diagram for explaining a buffer set control.

A portion of the cache memories provided within the storage apparatuses 1-1 and 1-2 may be used as the recording exclusive buffers 11 shown in FIG. 3. As will be described later, a plurality of control modules are provided in the storage apparatuses 1-1 and 1-2 to which the present invention is applicable, and the architecture is such that the cache memory is provided within each of the control modules. If the recording exclusive buffer 11 is acquired by only one control module, a memory capacity of the cache memory that may be used for a normal input and output (I/O) process of this one control module will become small. Hence, in order to efficiently utilize the hardware, the recording exclusive buffers 11 are distributively provided, that is, the recording exclusive buffer 11 is provided in each of the control modules.

In order to carry out the copy according to the integrated sending system with the sequence guarantee using the distributed recording exclusive buffers 11, a mechanism that is employed controls in a batch the individual recording exclusive buffers 11 that are distributed for each of control modules CM1, CM2, . . . as buffer sets B1, B2, . . . . By carrying out the store of the copy data to the recording exclusive buffers 11 and the developing of the copy data from the recording exclusive buffers 11 in the batch in units of the buffer sets B1, B2, . . . , the sequence of the entire storage system is guaranteed.

FIG. 4 is a table for explaining state of the buffer sets B1, B2, . . . . As shown in FIG. 4, the buffer sets B1, B2, . . . have states shown in the table of FIG. 4.

Each of the buffer sets B1, B2, . . . is first defined at the copy source, and assumes a set store state. Each of the buffer sets B1, B2, . . . has the recording exclusive buffer 11 in the store state in each of the control modules CM1, CM2, . . . . When the recording exclusive buffer 11 becomes full in one of the control modules CM1, CM2, . . . or, the predetermined elapses from the store of the copy data, a new buffer set is created by the buffer set control and the buffer set is switched to the buffer set in a set store state. Since this switching of the buffer sets is closely related to the sequence guarantee, it is necessary to stop the input and output process when carrying out the buffer switching. When the copy data not yet stored at the time of the buffer switching all become stored, the buffer set in a set extract state makes a transition to a set transfer state. The buffer set in the set transfer state instructs the transfer of the copy data from each recording exclusive buffer 11 of the buffer set, and further notifies the buffer set with respect to the copy destination.

At the copy destination, the buffer set makes a transition to a set reception state when the buffer set notification is received. When the reception of the copy data is completed in the recording exclusive buffer 11 of each of the control modules CM1, CM2, . . . , the buffer set makes a transition to a set reception complete state. In the set reception complete state, the developing of the copy data is instructed with respect to each recording exclusive buffer 11. When the developing of the copy data from all of the recording exclusive buffers 11 is completed, the buffer set makes a transition to a set developing complete state. When the buffer sets at the copy source assume a set complete state, the process of all of the buffer sets is completed.

2.3 Buffer Set Overlap Process:

FIG. 5 is a diagram for explaining a buffer set overlap process. In FIG. 5, a store process indicates the process of storing the copy data to the recording exclusive buffer 11 at the copy source. An extract process indicates the process of extracting the copy data stored in the recording exclusive buffer 11 at the copy source. A transmit and receive process indicates the process of transmitting the copy data extracted from the recording exclusive buffer 11 at the copy source and the process of receiving the copy data transmitted from the copy source by the recording exclusive buffer 11 at the copy destination. A develop process indicates the process of developing the copy data received by the recording exclusive buffer 11 at the copy destination in the recording medium 12 at the recording destination.

The processes with respect to the buffer sets B1, B2, . . . may be overlapped so as to efficiently transfer the copy data. Particularly in the case of the transmit and receive process that is carried out via a network, the overlap process becomes possible as indicated by a dotted line I in FIG. 5. In the case of the store process and the extract process, two buffer sets need to operate in cooperation with each other when switching the buffer sets, as indicated by a one-dot chain line II in FIG. 5. Further, in the case of the develop process, the overlap is not possible in order to achieve the sequence guarantee, as indicated by a two-dot chain line III in FIG. 5.

The transmit process may be carried out simultaneously with respect to two buffer sets. Hence, it is possible to effectively utilize the band of the network by carrying out the transmit process without interruption, while maintaining a state where the copy data of the older buffer sets are transmitted sooner.

Figure 6:
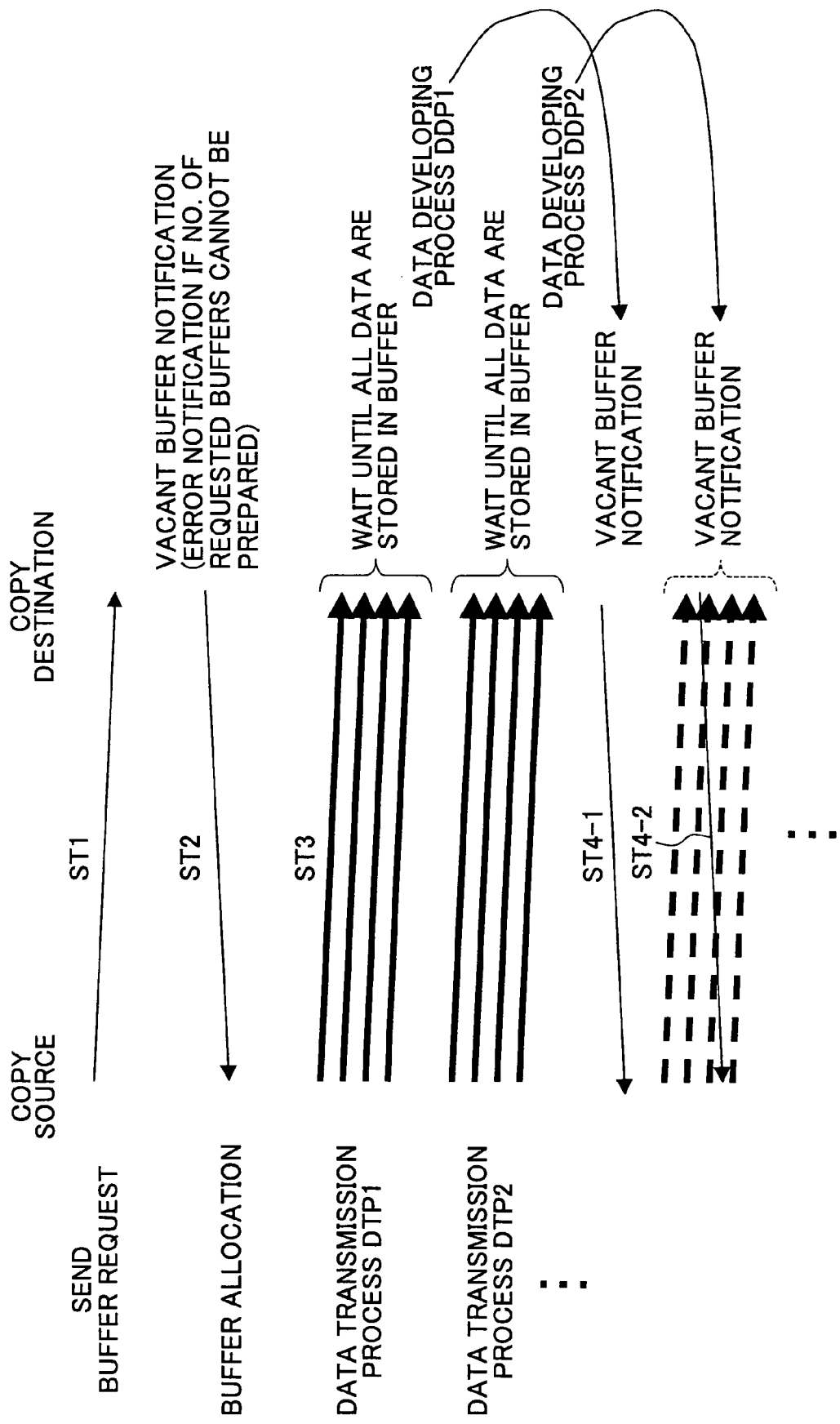
FIG. 6 is a diagram for explaining a remote location adapting sequence.

2.4 Remote Location Adapting Sequence:

FIG. 6 is a diagram for explaining a remote location adapting sequence.

In the case where a delay time of the path between the copy source and the copy destination is large, the up-and-down communication takes time if many handshakes occur between the copy source and the copy destination, and this may cause undesirable effects on the performance of the storage system. For this reason, the sequence is designed to minimize the number of waits.

As shown in FIG. 6, at the time of opening the path, a buffer request that requests a number of recording exclusive buffers 11 required and a buffer size desired is first sent from the copy source to the copy destination, in a step ST1. At the copy destination, the number of recording exclusive buffers 11 requested by the buffer request are prepared, and a buffer ID and a buffer size of each of the prepared recording exclusive buffers are notified to the copy source by a vacant buffer notification, in a step ST2. Hence, the recording exclusive buffers 11 are allocated to the copy source based on the vacant buffer notification. At the copy destination, if the number of recording exclusive buffers 11 requested by the buffer request cannot be prepared, an error notification is transmitted to the copy source in place of the vacant buffer notification, in the step ST2. With regard to the buffer size, it is sufficient to notify the number of recording exclusive buffers 11 that can be prepared by the vacant buffer notification. In the case where the copy destination can prepare the number of recording exclusive buffers 11 requested by the buffer request, the copy data is thereafter transferred from the copy source at an arbitrary timing, in a step ST3, and the copy destination notifies the copy source that the recording exclusive buffers 11 are prepared and receivable at a time when the recording exclusive buffers 11 are prepared and receivable, in steps ST4-1, ST4-2, . . . . The recording exclusive buffer 11 can be identified by the other apparatus from the buffer ID. When the recording exclusive buffer 11 becomes unusable due to degradation and the like of the control module, the recording exclusive buffer 11 may be restructured and notified to the copy source. Thus, the copy source does not need to hold the information of the previously notified recording exclusive buffer 11.

In the case shown in FIG. 6, the copy source carries out data transmission processes DPT1, DPT2, . . . a maximum of 8 times (up to the data transmission process DTP8) without waiting for a response from the copy destination. The copy destination waits until all of the copy data is stored in the recording exclusive buffers 11, with respect to each of the data transmission processes DTP1, DTP2, . . . , and thereafter carries out corresponding data developing processes DDP1, DDP2, . . . and makes a vacant buffer notification with respect to the copy source, in steps ST4-1, ST4-2, . . . .

Figure 7:
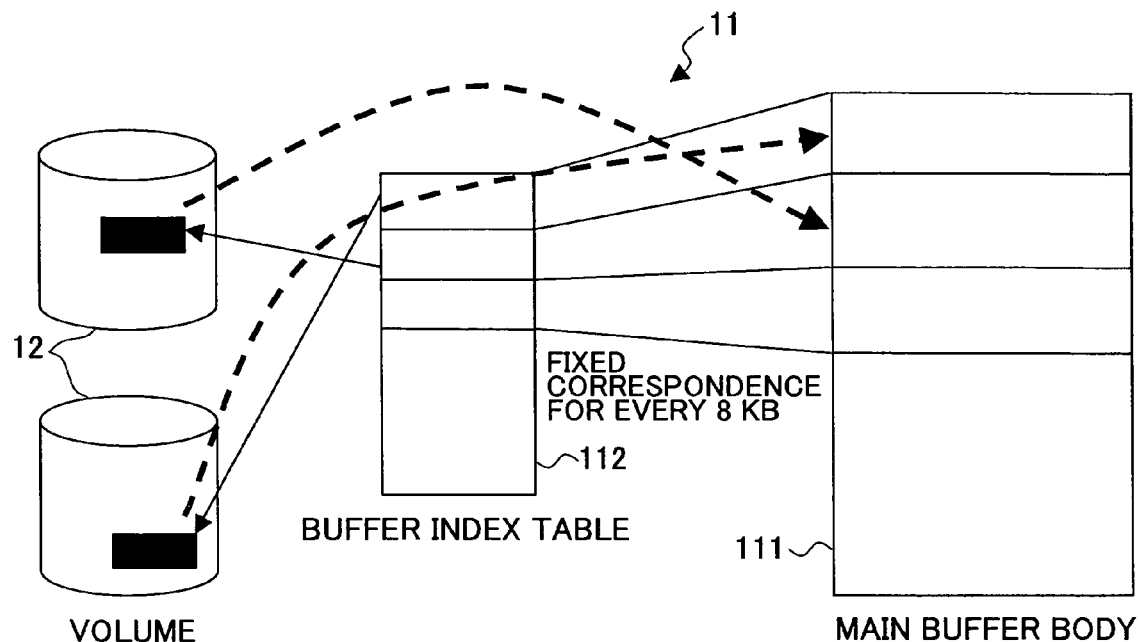
FIG. 7 is a diagram for explaining a recording exclusive buffer.
Figure 8:
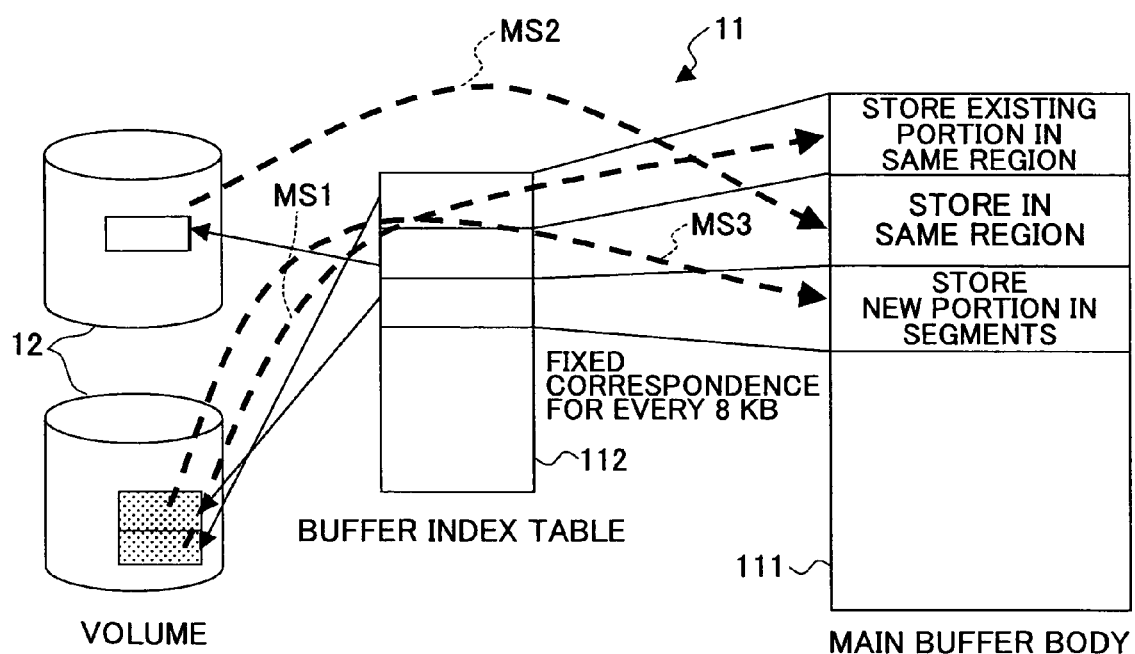
FIG. 8 is a diagram for explaining the recording exclusive buffer.

2.5 Recording Exclusive Buffer:

FIGS. 7 and 8 are diagrams for explaining the recording exclusive buffer 11.

As shown in FIG. 7, the recording exclusive buffer 11 is formed by a buffer main body 111 that stores the copy data, and a buffer index table 112 that stores information of the copy source and the copy destination with respect to each copy data. The buffer main body 111 can store the copy data in fixed units of 8 KB, for example. The buffer index table 112 stores logical address information and copy control information. The logical address information includes Logical Units (LUs) and/or Logical Block Addresses (LBAs), the size, the copy session number and the like of the copy source and the copy destination for the 8 KB copy data.

When transmitting from the recording exclusive buffer 11, the information of both the buffer main body 111 and the buffer index table 112 are transmitted simultaneously, so that the copy data can be developed at the copy destination.

As shown in FIG. 8, the buffer index table 112 does not separately hold the logical address information of the same region. In addition, when storing the logical address information in the buffer index table 112, a judgement is made to determine whether or not the logical address information is already stored by use of a hash table or the like, and the logical address information is stored in a new region if not yet stored. In the case where the logical address information is already stored, the logical address information is stored again in the stored region, as indicated by MS1 and MS2. In the case where the logical address information is to be stored in the region overlapping the region where the logical address information is already stored, the logical address information is segmented for every 8 KB and the segments are stored separately, as indicated by MS3. Accordingly, the copy data can be developed without being aware of the sequence when developing the copy data at the copy destination.

Figure 9:
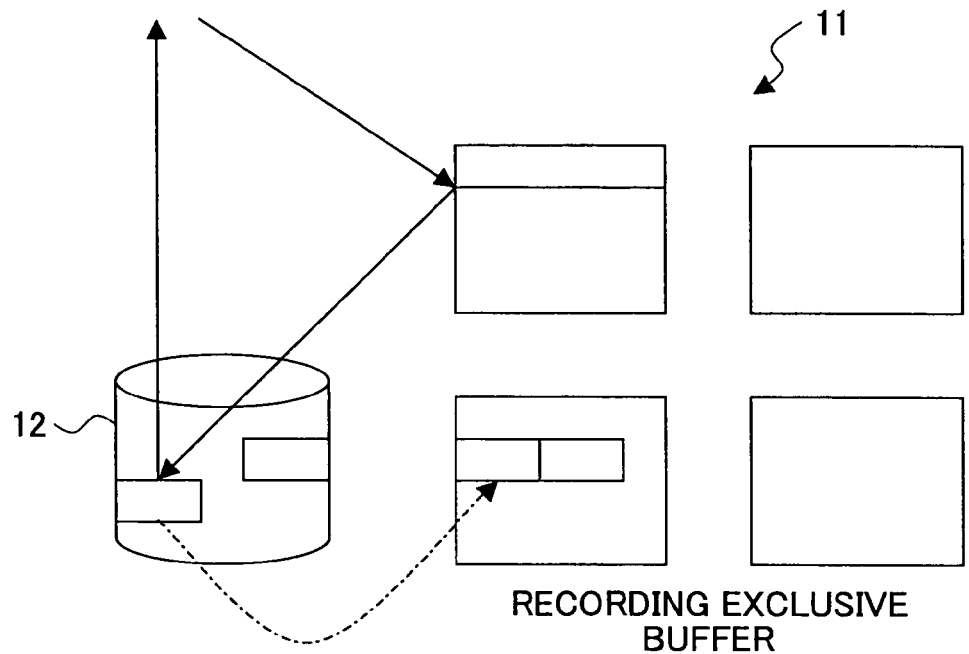
FIG. 9 is a diagram for explaining a write process, a store process and an extract process.
Figure 10:
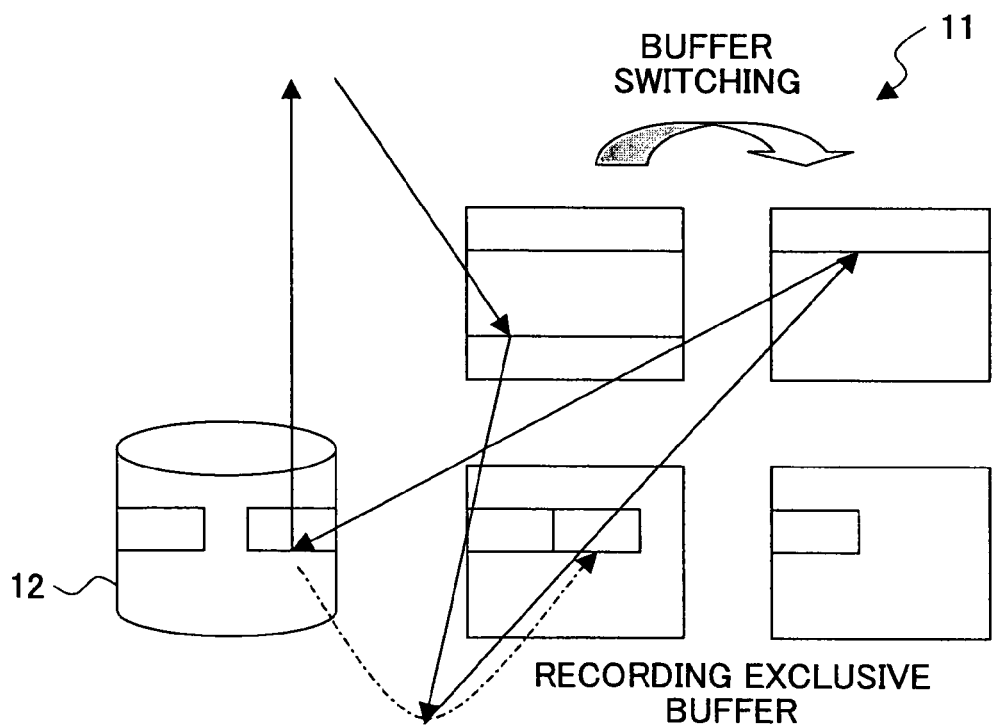
FIG. 10 is a diagram for explaining the write process, the store process and the extract process.

2.6 Write, Store and Extract Processes:

FIGS. 9 and 10 are diagrams for explaining a write process, a store process and an extract process.

As indicated by solid line arrows in FIG. 9, normally with respect to a copy request from the server, a response is returned to the server by merely storing in the buffer index table 112 the logical address information and the copy control information that are necessary for the copy process. For this reason, the load on the storage apparatus 1-1 at the copy source due to the process that is required to copy the data can be made small. However, if the write process were carried out with respect to the unstored region of the previous buffer set, the copy data would be destroyed. Hence, A judgement is made to determine whether or not an overlap exists between the unstored region of the previous buffer set and the region of the write process, when carrying out the extract process. If it is judged that the overlap exists, the write process is put on wait.

As indicated by a one-dot chain line in FIG. 9, the store process stores the copy data by making a reference to the buffer index table 112 asynchronously to the write process. The store process is not carried out immediately after the write process, so as not to interfere with the sequential write process.

The extract process stores the copy data with a priority when it is detected that the write process for successively storing the copy data that is not yet stored is put on wait.

When the unstored region of the previous buffer is updated after the switching of the buffer sets, the logical address information and the copy control information that are necessary for the store process are stored in the buffer index table 112 of the buffer set after the switching, as indicated by solid line arrows in FIG. 10, and the write process is then carried out with respect to the previous buffer set as indicated by a one-dot chain line in FIG. 10. With respect to other stored regions, the process is carried out with respect to the buffer set after the switching.

Figure 11:
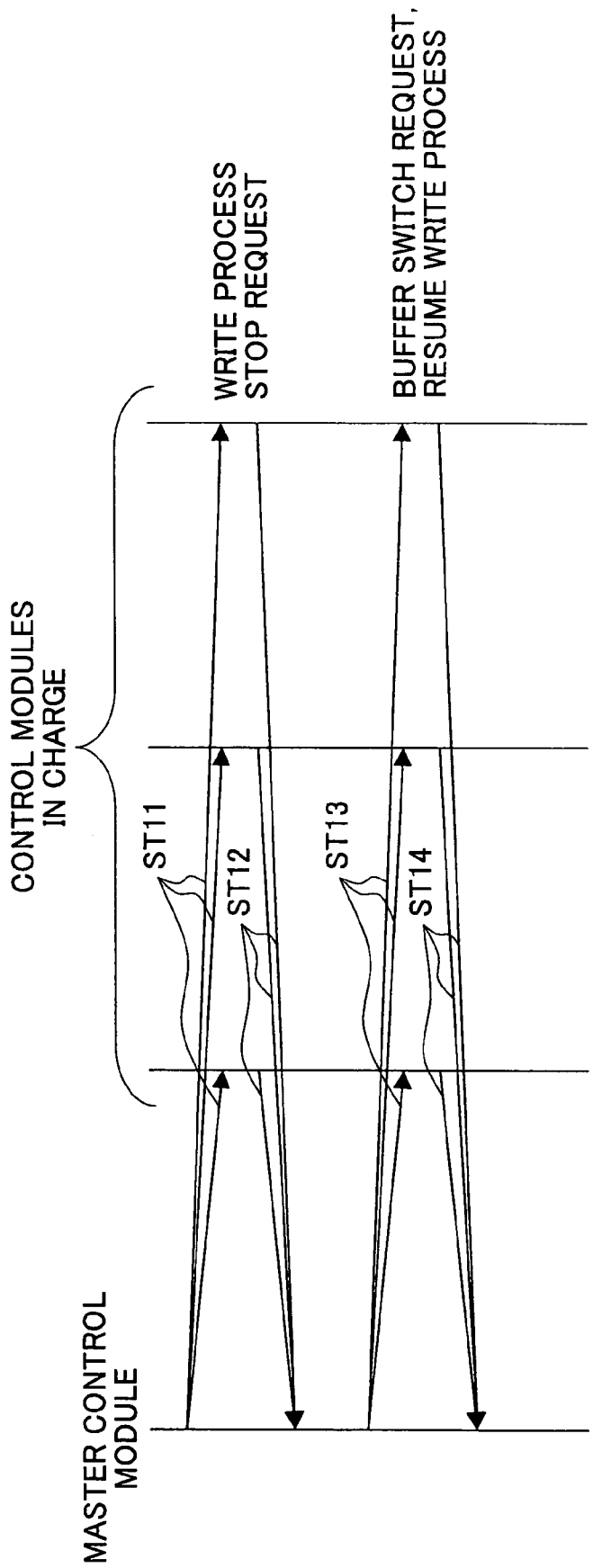
FIG. 11 is a diagram for explaining a buffer switch process.

2.7 Buffer Switching:

FIG. 11 is a diagram for explaining a buffer switch process.

The switching of the recording exclusive buffers 11 needs to be carried out while maintaining the sequence of the write process, and thus, the input and output process must be stopped temporarily. But in the storage apparatus to which the present invention is applicable, the input and output process is carried out by the plurality of control modules, and the recording exclusive buffers 11 are switched by stopping the input and output process in a synchronized manner for all of the control modules.

As shown in FIG. 11, a write process stop request is first made from a master control module to all control modules (all control modules in charge), in a step ST11. Each of the control modules in charge that receives the write process stop request performs a write stop (or write lock) so that no new storage can be made by a store process to the recording exclusive buffer 11, and returns a response to the master control module, in a step ST12. Next, the master control module waits for the response to the write process stop request from all of the control modules in charge, and thereafter outputs a buffer switch request with respect to all of the control modules in charge, in a step ST13. Each of the control modules in charge that receives the buffer switch request cancels the write stop (or write lock), switches the recording exclusive buffers 11, and makes a notification to the master control module to notify that the write process can be resumed, in a step ST14.

The switching of the recording exclusive buffer 11 may be made at a timing when one of the recording exclusive buffers 11 at the copy source becomes full or, at a timing when the recording exclusive buffers 11 are not switched for a predetermined time.

In the case where no recording exclusive buffer 11 to which the switching is to be made exists, the switch process may perform a retry process. In this case, the write process at the copy source must wait during the retry process, but this may be regarded as being consistent with the load adjustment, since the retry process is caused by the lack of recording exclusive buffer 11. When the vacant buffer notification related to the recording exclusive buffer 11 is received from the copy destination, the recording exclusive buffers 11 are switched immediately at the copy source. As a result, the input and output process that was put on wait can be carried out. For example, in a case where the switch process is attempted again after a predetermined time (for example, 10 seconds) elapses from a time when the switch process with respect to the recording exclusive buffers 11 fails, it is possible to activate an automatic halt function due to the lack of recording exclusive buffer 11.

Figure 12:
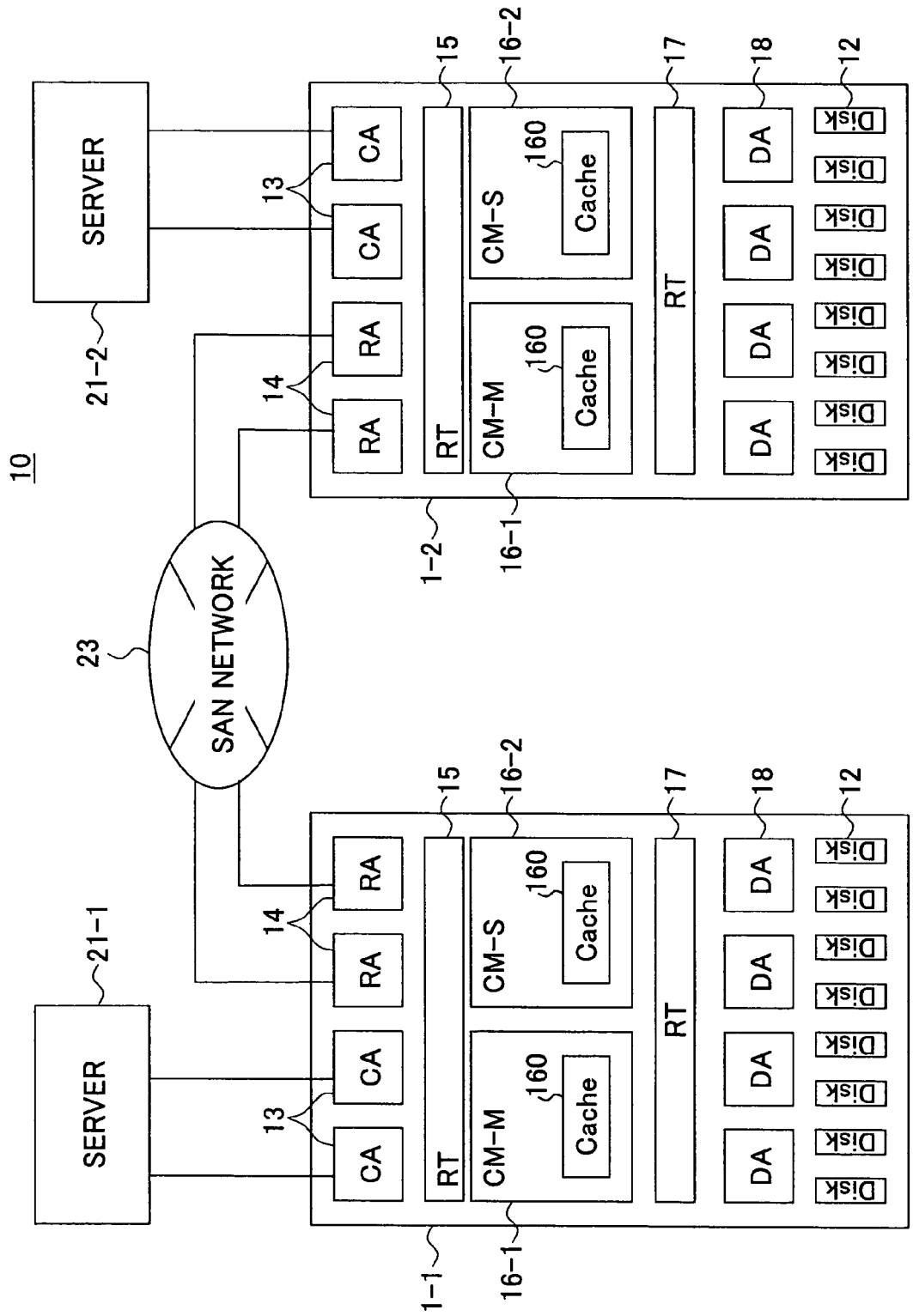
FIG. 12 is a system block diagram showing an important part of an embodiment of a storage system according to the present invention.

2.8 Structure of Storage System:

FIG. 12 is a system block diagram showing an important part of an embodiment of the storage system according to the present invention. A storage system 10 shown in FIG. 12 includes a server 21-1 and a storage apparatus 1-1 that are mutually connected, a server 21-2 and a storage apparatus 1-2 that are mutually connected, and a network 23 such as a Storage Area Network (SAN) connecting the storage apparatuses 1-1 and 1-2. It is assumed for the sake of convenience that the servers 21-1 and 21-2 are formed by general-purpose computers having the same structure, and the storage apparatuses 1-1 and 1-2 have the same Redundant Array of Independent Disks (RAID) structure.

Each of the storage apparatuses 1-1 and 1-2 includes a plurality of Communication Adapters (CAs) 13 that are used for the communication with the corresponding one of the servers 21-1 and 21-2, a plurality of Remote Adapters (RAs) 14 used for the remote copy via a network 23, a Controller Module-Master (CM-M) 16-1 that control the entire operation of each of the storage apparatuses 1-1 and 1-2, a Controller Module-Slave (CM-S) 16-2 that controls the entire operation of each of the storage apparatuses 1-1 and 1-2 in a slave relationship with respect to the master control module 16-1, a Router (RT) 17, a plurality of Device Adapters (DAs) 18 that control the communication with the recording media 12, and the plurality of recording media 12. In this embodiment, the recording medium 12 is formed by a magnetic disk drive. Each of the control modules 16-1 and 16-2 includes a cache memory 160. Of course, the number of control modules within each of the storage apparatuses 1-1 and 1-2 is not limited to 2.

It is assumed for the sake of convenience that, in the remote copy, the data written from the server 21-1 to the storage apparatus 1-1 at the copy source is written via the network 23 to the storage apparatus 1-2 which is at the copy destination and is under control of the server 21-2.

Figure 13:
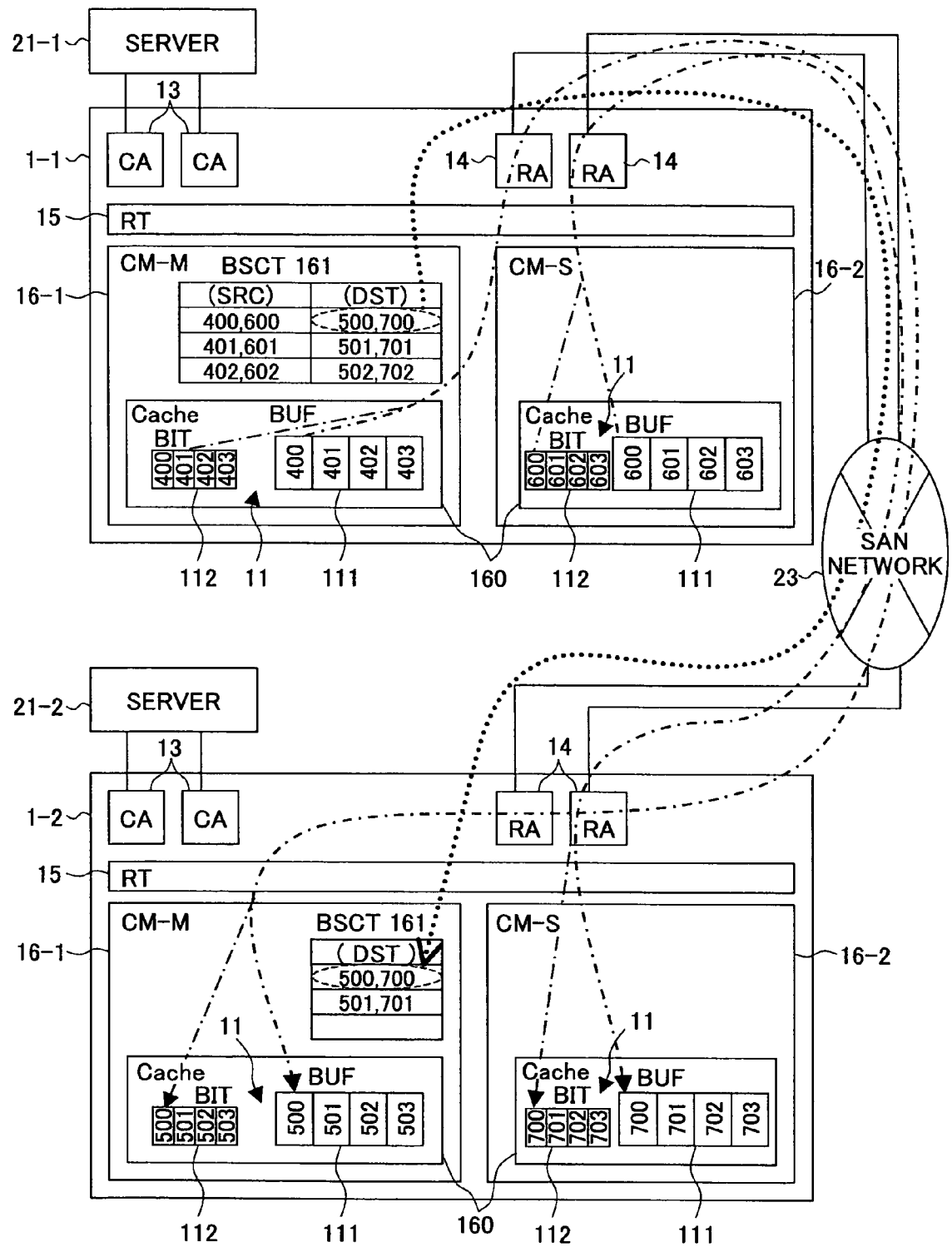
FIG. 13 is a system block diagram showing a flow of data at the time of a remote copy.
Figure 14:
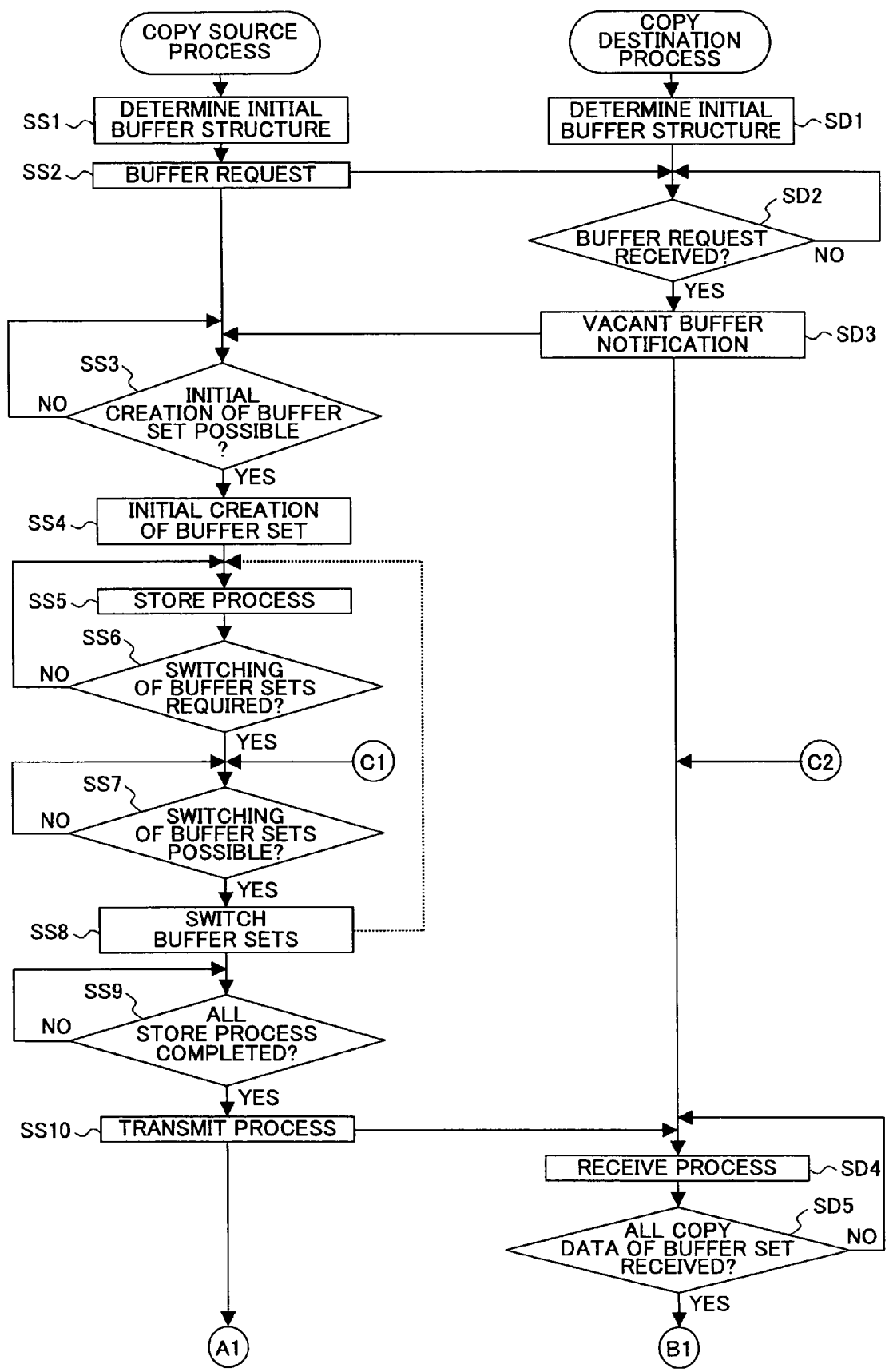
FIG. 14 is a flow chart for explaining a procedure of the remote copy.
Figure 15:
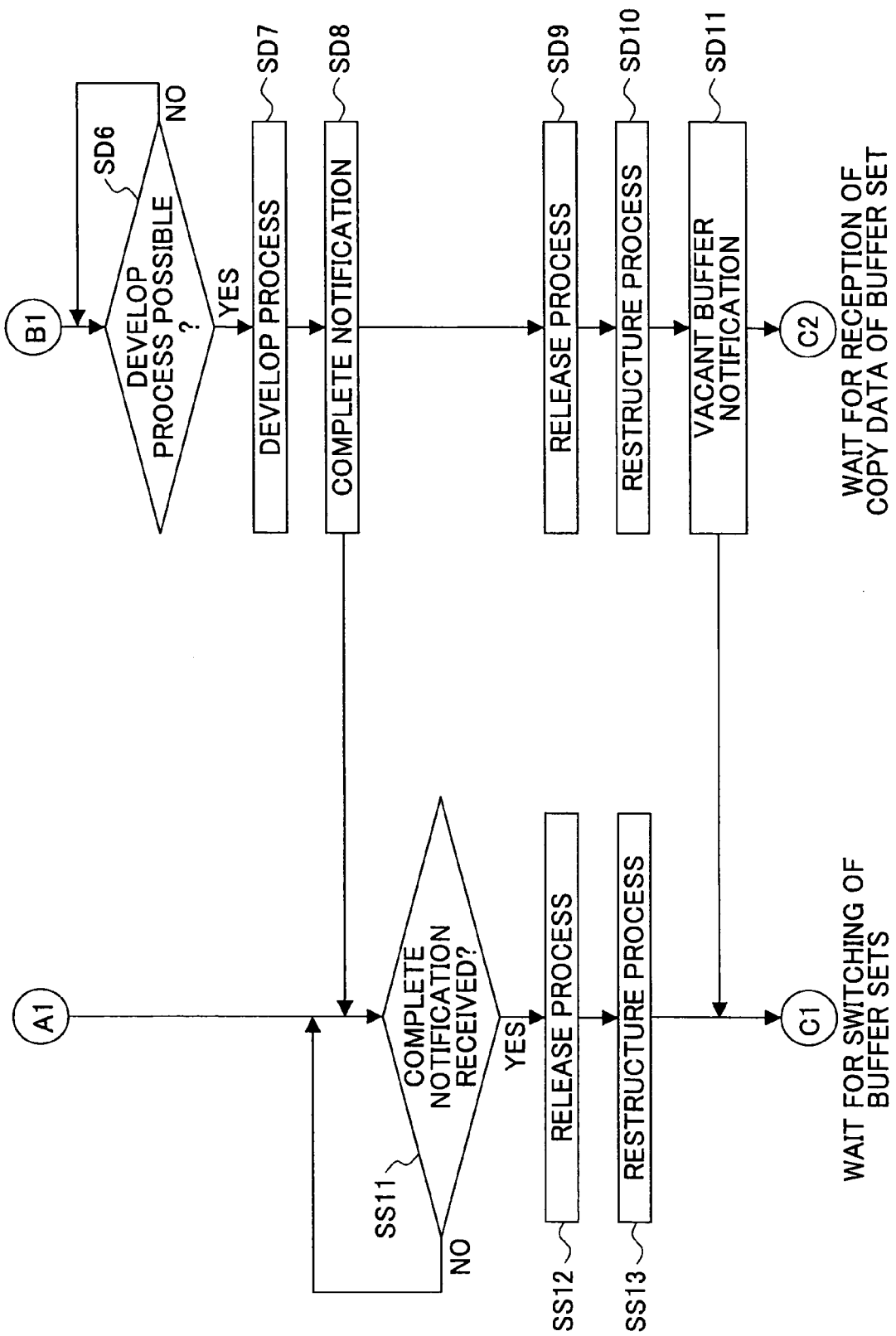
FIG. 15 is a flow chart for explaining the procedure of the remote copy.

2.9 Operation of Storage System:

FIG. 13 is a system block diagram showing a flow of data at the time of the remote copy. In FIG. 13, those parts which are the same as those corresponding parts in FIG. 12 are designated by the same reference numerals, and a description thereof will be omitted. FIGS. 14 and 15 are flow charts for explaining a procedure of the remote copy.

As shown in FIG. 13, a cache memory 160 within each of the control modules 16-1 and 16-2 includes a recording exclusive buffer 11 that is formed by a main buffer part (BUF) 111 and a Buffer Index Table (BIT) 112. In addition, the cache memory 160 within the master control module 16-1 further includes a Buffer Set Control Table (BSCT) 161. The buffer set control table 161 stores and manages combinations of the recording exclusive buffers 11 (for copy) at the copy source and the copy destination, as buffer sets. In the particular case shown in FIG. 13, a buffer ID "400, 600" of the copy source (SRC) and a buffer ID "500, 700" of the copy destination (DST) are related, and the related buffer IDs are stored and managed in the buffer set control table 161 as the buffer set. The main buffer part 111 of the recording exclusive buffer 11 stores the data to be copied, that is, the copy data. The buffer index table 112 of the recording exclusive buffer 11 stores the index information of the copy data in the main buffer part 111, namely, the logical address information, such as the LUN and the LBA, and the copy control information.

In FIGS. 14 and 15, processes of the storage apparatus 2-1 at the copy source are indicated by steps SS1 through SS13, and processes of the storage apparatus 2-2 at the copy destination are indicated by steps SD1 through SD11. A process of determining an initial structure of the buffer set of the recording exclusive buffer 11 is carried out at the copy source and the copy destination, in the steps SS1 and SD1. At the copy source, a buffer request is made to request the recording exclusive buffer 11, in the step SS2, and at the copy destination, a judgement is made to determine whether or not the buffer request is received, in the step SD2. When the buffer request is received at the copy destination and the judgement result in the step SD2 is YES, a vacant buffer notification is made in the step SD3.

At the copy source, when the vacant buffer notification is received, a judgement is made to determine whether or not an initial creation of the buffer set is possible, in the step SS3. If the judgement result in the step SS3 is YES, the initial creation of the buffer set is made in the step SS4, and a store process is carried out with respect to the buffer set in the step SS5. At the copy source, a judgement is made to determine whether or not the switching of the buffer sets is required, in the step SS6. The process returns to the step SS5 if the judgement result in the step SS6 is NO. At the copy source, if the judgement result in the step SS6 is YES, a judgement is made to determine whether or not a buffer switch process with respect to the buffer set is possible, in the step SS7. If the judgement result in the step SS7 is YES, the buffer switch process with respect to the buffer set is carried out in the sep SS8. The flow of the process with respect to the switched buffer set is indicated by a dotted line in FIG. 15. Furthermore, at the copy source, a judgement is made to determine whether or not all store process with respect to the buffer set is completed, in the step SS9. If the judgement result in the step SS9 is YES, a transmit process to transmit the copy data with respect to the buffer set is carried out in the step SS10.

At the copy destination, a receive process is carried out with respect to the copy data of the buffer set transmitted from the copy source, in the step SD4. In addition, at the copy destination, a judgement is made to determine whether or not all copy data of the buffer set is received, in the step SD5. At the copy destination, if the judgement result in the step SD5 is YES, a judgement is made to determine whether or not the develop process is possible with respect to the copy data of the buffer set, in the step SD6, as shown in FIG. 15. At the copy destination, if the judgement result in the step SD6 is YES, the develop process with respect to the copy data of the buffer set is carried out in the step SD7, and a complete notification indicating that the develop process with respect to the copy data of the buffer set is completed is made to the copy source, in the step SD8.

At the copy source, a judgement is made to determine whether or not the complete notification is received from the copy destination, in the step SS11. If the judgement result in the step SS11 is YES, a release process is carried out to release the buffer set in the step SS12. Further, a restructure process is carried out to restructure the buffer set in the step SS13, and the process returns to the step SS7 shown in FIG. 14 so as to wait for the switching of the buffer sets.

On the other hand, at the copy destination, after making the complete notification, a release process is carried out to release the buffer set in the step SD9. In addition, a restructure process is carried out to restructure the buffer set in the step SD10. Moreover, at the copy destination, a vacant buffer notification is made to the copy source in the step SD11, and the process returns to the step SD4 shown in FIG. 14 so as to wait for the reception of the copy data of the buffer set.

Accordingly, as indicated by the dotted line arrow in FIG. 13, the buffer ID "500, 700" in the buffer set control table 161 within the master control module 16-1 of the storage apparatus 1-1 at the copy source is copied to the buffer set control module 161 within the master control module 16-1 of the storage apparatus 1-2 at the copy destination. And as indicated by the one-dot chain line arrow, the contents of the main buffer part 111 and the buffer index table 112 within the master control module 16-1 and the contents of the main buffer part 111 and the buffer index table 112 within the slave control module 16-2, of the storage apparatus 1-1 at the copy source, are respectively copied to the main buffer part 111 and the buffer index table 112 within the master control module 16-1 and the contents of the main buffer part 111 and the buffer index table 112 within the slave control module 16-2, of the storage apparatus 1-2 at the copy destination.

Figure 16:
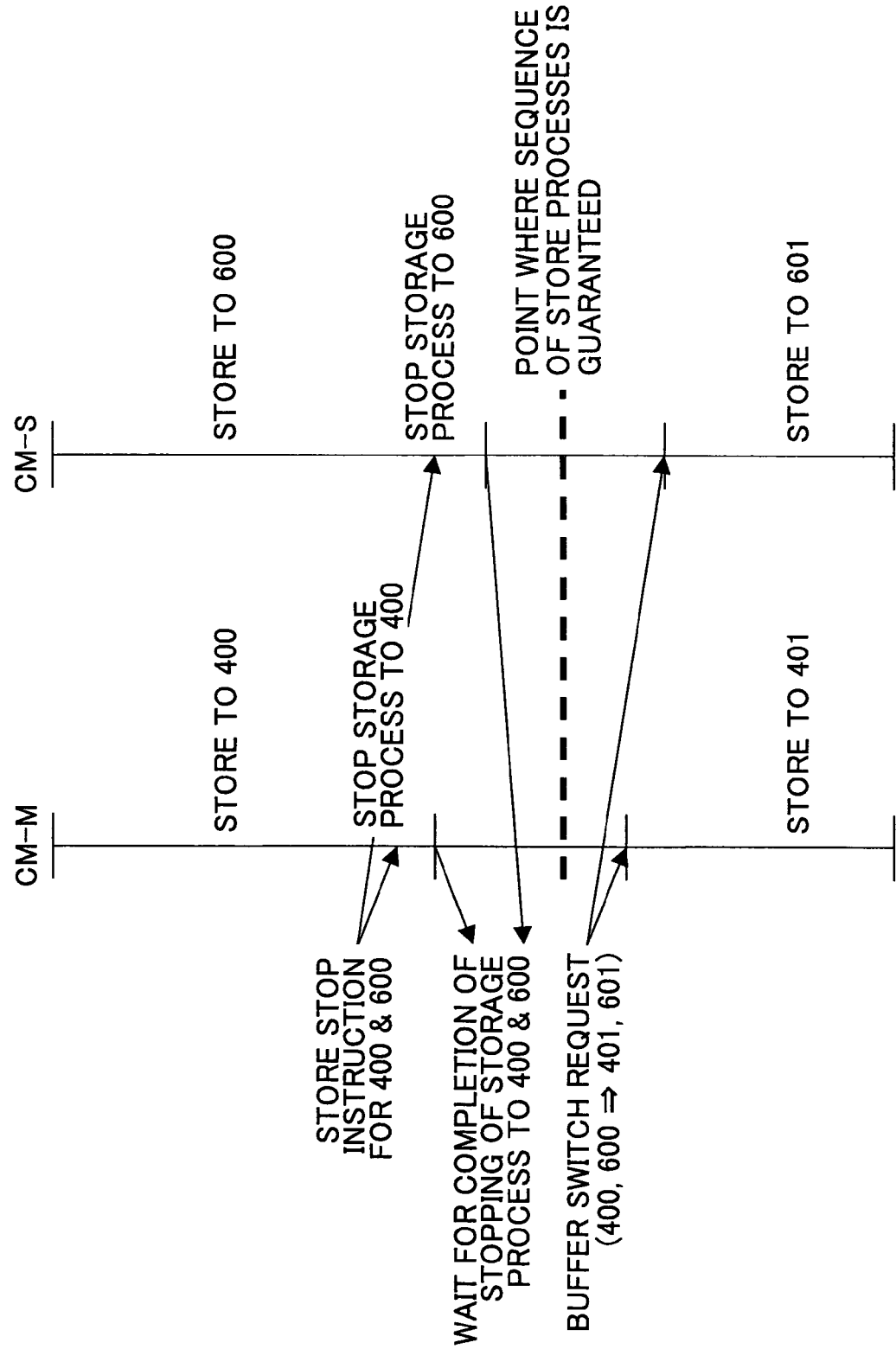
FIG. 16 is a diagram for explaining the buffer switch process.
Figure 17:
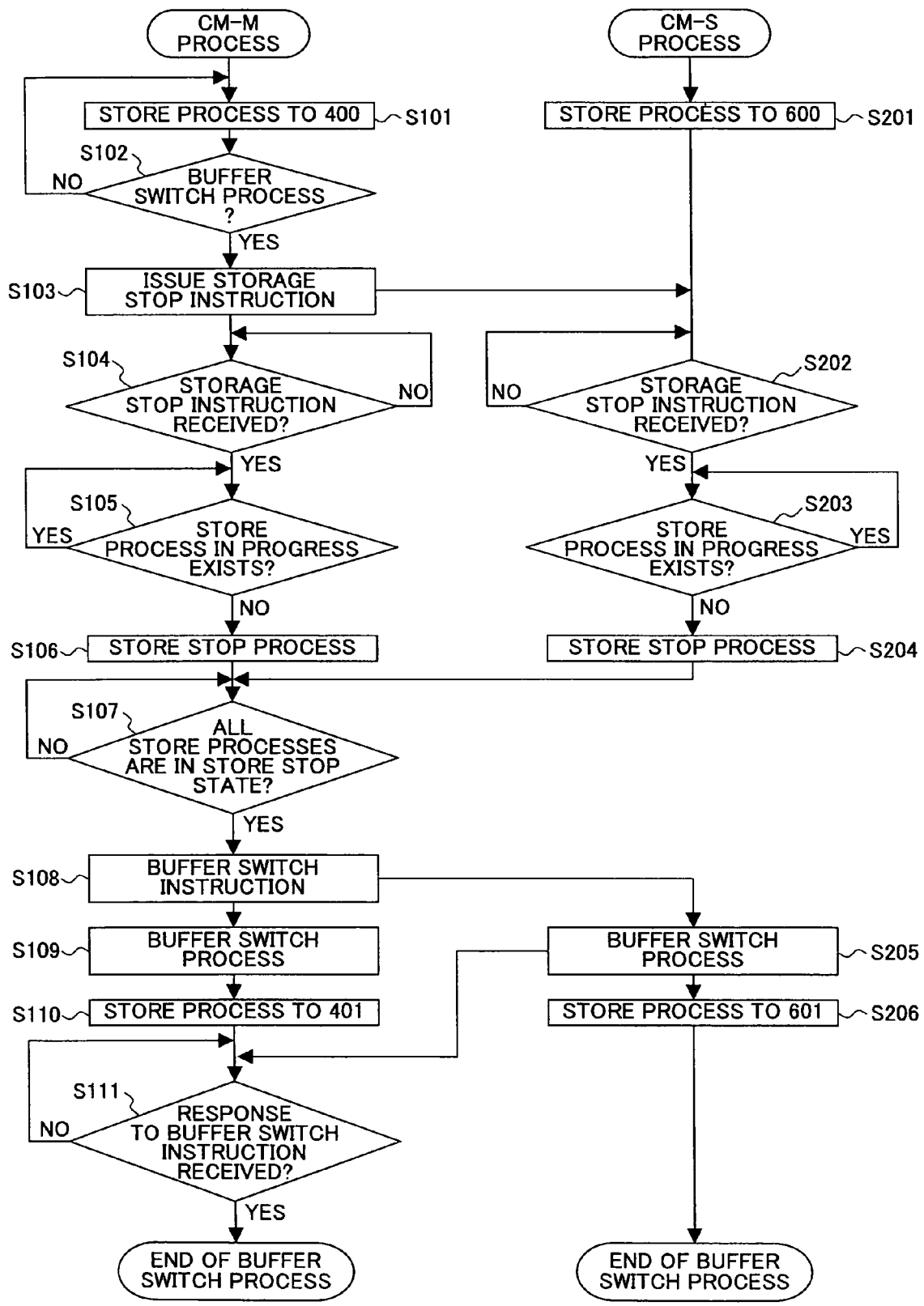
FIG. 17 is a flow chart for explaining the procedure of the buffer switch process.

FIG. 16 is a diagram for explaining the buffer switch process, and FIG. 17 is a flow chart for explaining the procedure of the buffer switch process.

It is assumed for the sake of convenience that a store process to the buffer ID "400" is carried out in the master control module 16-1 of the storage apparatus 1-1 at the copy source, and that a store process to the buffer ID "600" is carried out in the slave control module 16-2 of the storage apparatus 1-1 at the copy source, as shown in FIG. 16. In this case, if a store stop instruction (or a stop request) for the buffer ID "400" is received with respect to the master control module 16-1 and a store stop instruction (or a stop request) for the buffer ID "600" is received with respect to the slave control module 16-2, the completion of the stopping of the storage process to the buffer ID "400" and the completion of the stopping of the storage process to the buffer ID "600" are waited, so as to determine a point where the sequence of the store processes is guaranteed as indicated by a bold dotted line in FIG. 16. In the master control module 16-1, a store process to a buffer ID "401" is carried out in response to a buffer switch instruction (or a buffer switch request) instructing the switching from the buffer ID "400" to the buffer ID "401". On the other hand, in the slave control module 16-2, a store process to a buffer ID "601" is carried out in response to a buffer switch instruction (or a buffer switch request) instructing the switching from the buffer ID "600" to the buffer ID "601".

In FIG. 17, processes of the master control module 16-1 within the storage apparatus 1-1 at the copy source are indicated by steps S101 through S111, and processes of the slave control module 16-2 within the storage apparatus 1-1 at the copy source are indicated by steps S201 through S206.

In FIG. 17, the store process to the buffer ID "400" is carried out in the master control module 16-1 in the step S101, and the store process to the buffer ID "600" is carried out in the slave control module 16-2 in the step S201. The master control module 16-1 judges whether or not the buffer switch process is carried out, in the step S102, and the storage stop instruction is issued and supplied to the slave control module 1602 in the step S103 if the judgement result in the step S101 is YES.

The master control module 16-1 judges whether or not the store stop instruction is received, in the step S104. If the judgement result in the step S104 is YES, the master control module 16-1 judges whether or not a store process in progress exists, in the step S105. The master control module 16-1 carries out the store stop process in the step S106 if the judgement result in the step S105 is NO. Similarly, the slave control module 16-2 judges whether or not the store stop instruction is received, in the step S202. If the judgement result in the step S202 is YES, the slave control module 16-2 judges whether or not a store process in progress exists, in the step S203. The slave control module 16-2 carries out the store stop process in the step S204 if the judgement result in the step S203 is NO.

In the master control modules 16-1, a judgement is made to determine whether or not all of the store processes are in the store stop state, in the step S107. If the judgement result in the step S107 is YES, the master control module 16-1 issues and supplies a buffer switch instruction to the slave control module 16-2, in the step S108.

In the master control module 16-1, a buffer switch process is carried out in response to the buffer switch instruction, and a response to the buffer switch instruction is notified, in the step S109. In addition, the store process to the buffer ID "401" is carried out in the step S110. On the other hand, in the slave control module 16-2, a buffer switch process is carried out in response to the buffer switch instruction, and a response to the buffer switch instruction is notified to the master control module 16-1, in the step S205. Further, the store process to the buffer ID "601" is carried out in the step S206, and the process of the slave control module 16-2 ends. In the master control module 16-1, a judgement is made to determine whether or not the responses to the buffer switch instructions are received from the master and slave control modules 16-1 and 16-2, in the step S111. The process of the master control module 16-1 ends if the judgement result in the step S111 is YES.

Figure 18:
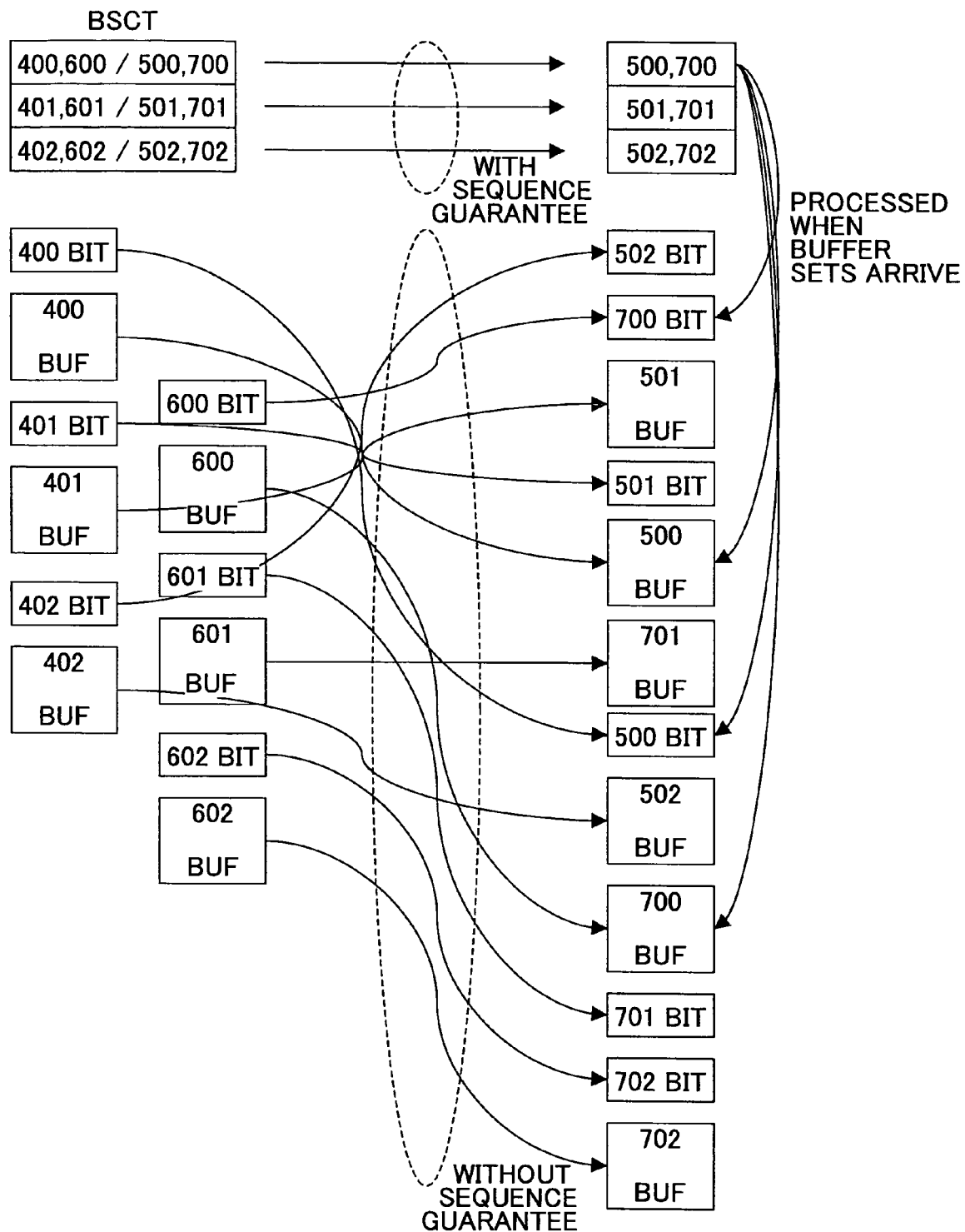
FIG. 18 is a diagram for explaining a buffer set control.
Figure 19:
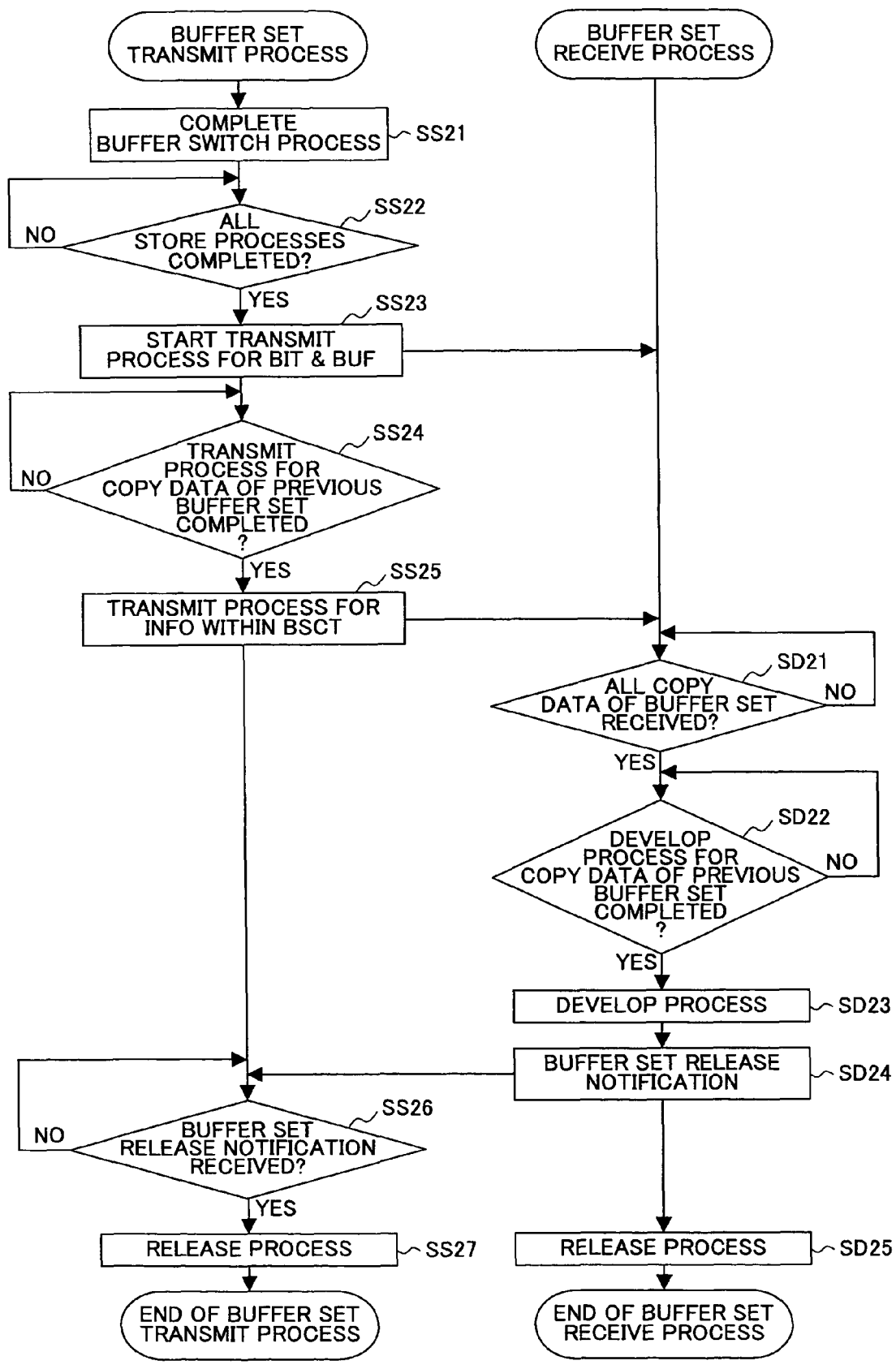
FIG. 19 is a flow chart for explaining a procedure of the buffer set control.

FIG. 18 is a diagram for explaining a buffer set control, and FIG. 19 is a flow chart for explaining a procedure of the buffer set control.

As shown in FIG. 18, the buffer ID "500, 700" and the like in the buffer set control table 161 within the master control module 16-1 of the storage apparatus 1-1 at the copy source are copied to the buffer set control table 161 within the master control module 16-1 of the storage apparatus 1-2 at the copy destination. The contents of the main buffer part 111 and the buffer index table 112 within the master control module 16-1 of the storage apparatus 1-1 at the copy source and the contents of the main buffer part 111 and the buffer index table 112 within the slave control module 16-2 of the storage apparatus 1-1 at the copy source are respectively copied to the main buffer part 111 and the buffer index table 112 within the master control module 16-1 of the storage apparatus 1-2 at the copy destination and the main buffer part 111 and the buffer index table 112 within the slave control module 16-2 of the storage apparatus 1-2 at the copy destination. The sequence guarantee is made with respect to the logical addresses that are copied to the buffer set control table 161, but there is no sequence guarantee with respect to the contents that are copied to the main buffer part 111 and the buffer index table 112, and the copy process is carried out at the time when the buffer sets are prepared.

In FIG. 19, a buffer set transmit process carried out by the control modules 16-1 and 16-2 within the storage apparatus 1-1 at the copy source is indicated by steps SS21 through SS27, and a buffer set receive process carried out by the control modules 16-1 and 16-2 within the storage apparatus 1-2 at the copy destination is indicated by steps SD21 through SD25.

In FIG. 19, in the control modules 16-1 and 16-2 within the storage apparatus 1-1 at the copy source, when a buffer switch process is completed in the step SS21, a judgement is made to determine whether or not all store processes are completed, in the step SS22. If the judgement result in the step SS22 is YES, a transmit process for the contents of the buffer index table 112 and the main buffer part 111 is started with respect to the control modules 16-1 and 16-2 within the storage apparatuses 1-1 and 1-2 at the copy source and the copy destination, in the step SS23.

In the control modules 16-1 and 16-2 within the storage apparatus 1-1 at the copy source, a judgement is made to determine whether or not the transmit process for the copy data of the previous buffer set is completed, in the step SS24. If the judgement result in the step SS24 is YES, a transmit process for the information within the buffer set control table 161 is carried out with respect to the control modules 16-1 and 16-2 within the storage apparatus 1-2 at the copy destination, in the step SS25.

In the control modules 16-1 and 16-2 within the storage apparatus 1-2 at the copy destination, a judgement is made to determine whether or not all copy data of the buffer set are received, in the step SD21. If the judgement result in the step SD21 is YES, a judgement is made to determine whether or not a develop process for the copy data of the previous buffer set is completed, in the step SD22. If the judgement result in the step SD22 is YES, a develop process with respect to the copy data of the present buffer set is carried out in the step SD23. In addition, a buffer set release notification is made with respect to the control modules 16-1 and 16-2 within the storage apparatus 1-1 at the copy source, in the step SD24. Further, a release process is carried out with respect to the copy data of the buffer set in the step SD25, and the process ends.

In the control modules 16-1 and 16-2 within the storage apparatus 1-1 at the copy source, a judgement is made to determine whether or not the buffer set release notification is received from the copy destination, in the step SS26. If the judgement result in the step SS26 is YES, a release process is carried out with respect to the copy data of the buffer set in the step SS27, and the process ends.

As described above in conjunction with FIG. 5, the copy data can be transferred efficiently by overlapping the processes of the buffer sets. Particularly in the case of the transmitting and receiving processes that are carried out via the network, the overlap process is enabled as indicated by the dotted line I in FIG. 5.

FIG. 20 is a diagram for explaining an optimization of transfer multiplicity. As shown in FIG. 20, in a case C1 where a single multiplex transmission is made, gaps G1 and G2 are generated in the transfer of the copy data. In a case C3 where a triple multiplex transmission is made, the copy data that cannot be developed even if transferred quickly prevents the transfer of the copy data that is to be transferred and developed quickly, and this case C3 is thus undesirable. Accordingly, in this embodiment which corresponds to a case C2 where a double multiplex transmission is made, an optimum transfer multiplicity is realized.

Therefore, the present invention is applicable to storage systems in which the sequence guarantee, and the sequential write performance and the transfer efficiency at the copy source are required.

Further, the present invention is not limited to these embodiments, but various variations and modifications may be made without departing from the scope of the present invention.

What is claimed is:

1. A remote copy method for copying data within a first storage apparatus into a second storage apparatus via a network, comprising:

in the first storage apparatus, writing the data to a first recording medium, storing, to a buffer index table, information related to the data that is written in the first recording medium and is to be stored in a first recording exclusive buffer within the first storage apparatus for data consistency, and returning a complete response with respect to a server which requests a write process;

storing the data that is written in the first recording medium to the first recording exclusive buffer asynchronously to the write process that writes the data to the first recording medium by referring to the buffer index table;

judging whether a region of the first recording medium to which a next write process is to write first arbitrary data overlaps a region of the first recording medium that is written with second arbitrary data that has not yet been stored to the first recording exclusive buffer, when the next write process is requested from the server while the data that is written in the first recording medium is being stored to the first recording exclusive buffer;

storing the data written in the first recording medium to the first recording exclusive buffer with priority by putting the next write process on wait if the overlap exists;

in the first storage apparatus, collectively transmitting the data within the first recording exclusive buffer to the second storage apparatus if the first recording exclusive buffer is full, or a predetermined time elapses from a time of storage of the data that is written in the first recording medium to the first recording exclusive buffer;

in the second storage apparatus, storing the data received from the first storage apparatus to one or a plurality of second recording exclusive buffers within the second storage apparatus; and in the second storage apparatus, collectively developing the data within the one or the plurality of second recording exclusive buffers to a second recording medium at a copy destination if reception of the data from the first storage apparatus is completed.

2. The remote copy method as claimed in claim 1, further comprising:

in the first storage apparatus, transmitting a buffer request requesting a number of the second recording exclusive buffers and a buffer size to the second storage apparatus; and in the second storage apparatus, preparing the number of the second recording exclusive buffers requested by the buffer request, and notifying a buffer ID and a buffer size of the second recording exclusive buffers that are prepared to the first storage apparatus, wherein said collectively transmitting the data within the first recording exclusive buffer to the second storage apparatus is performed a predetermined number of times without waiting for a response from the second storage apparatus.

3. The remote copy method as claimed in claim 2, wherein said storing the data in the first recording medium to the first recording exclusive buffer includes storing information related to a copy source and the copy destination required for said copying to the buffer index table, and storing the data in the first recording medium and specified by the information related to the copy source and the copy destination to a main buffer part within the first recording exclusive buffer.

4. A storage system, comprising:
a first storage apparatus including a first control module, a first recording medium, a first recording exclusive buffer, and a buffer index table; and
a second storage apparatus, connectable to the first storage apparatus via a network, and including a second control module, a second recording medium, and a second recording exclusive buffer,
wherein a remote copy is performed by copying data within the first storage apparatus into the second storage apparatus via the network:
in the first storage apparatus,
the first control module writes the data to the first recording medium, stores, to a buffer index table, information related to the data that is written in the first recording medium and is to be stored in the first recording exclusive buffer within the first storage apparatus for data consistency, and returns a complete response with respect to a server which requests a write process;
the first control module stores the data that is written in the first recording medium to the first recording exclusive buffer asynchronously to the write process that writes the data to the first recording medium by referring to the buffer index table, judges whether a region of the first recording medium to which a next write process is to write first arbitrary data overlaps a region of the first recording medium that is written with second arbitrary data that has not yet been stored to the first recording exclusive buffer, when the next write process is requested from the server while the data that is written in the first recording medium is being stored to the first recording exclusive buffer, and stores the data written in the first recording medium to the first recording exclusive buffer with priority by putting the next write process on wait if the overlap exists; and
the first control module collectively transmits the data within the first recording exclusive buffer to the second storage apparatus if the first recording exclusive buffer is full, or a predetermined time elapses from a time of storage of the data that is written in the first recording medium to the first recording exclusive buffer, and
in the second storage apparatus,
the second control module stores the data received from the first storage apparatus to one or a plurality of second recording exclusive buffers within the second storage apparatus, and collectively develops the data within the one or the plurality of second recording exclusive buffers to the second recording medium at a copy destination if reception of the data from the first storage apparatus is completed.

5. The storage system as claimed in claim 4, wherein:
the first control module transmits a buffer request requesting a number of the second recording exclusive buffers and a buffer size to the second storage apparatus; and
the second control module prepares the number of the second recording exclusive buffers requested by the buffer request, and notifies a buffer ID and a buffer size of the second recording exclusive buffers that are prepared to the first storage apparatus,
wherein the first control module collectively transmits the data within the first recording exclusive buffer to the second storage apparatus a predetermined number of times without waiting for a response from the second storage apparatus.

6. The storage system as claimed in claim 5, wherein the first control module stores information related to a copy source and the copy destination required for said copying to the buffer index table, and stores the data in the first recording medium and specified by the information related to the copy source and the copy destination to a main buffer part within the first recording exclusive buffer.

7. The storage system as claimed in claim 4, wherein the first control module transmits the data in units of first buffer sets each formed by a plurality of first recording exclusive buffers, and the second control module receives the data in units of buffer sets each formed by a plurality of second recording exclusive buffers, so as to maintain a sequence guarantee with respect to the data that is copied.

8. The storage system as claimed in claim 7, wherein each of the first and second buffer sets comprises a plurality of buffer sets so as to enable the data to be transmitted and received without interruption, and a pipeline operation is performed.

9. A remote copy method for copying data within a first storage apparatus into a second storage apparatus via a network, comprising:
in the first storage apparatus, writing the data to a first recording medium, storing, to a buffer index table, information related to the data that is written in the first recording medium and is to be stored in a first recording exclusive buffer within the first storage apparatus for data consistency, and returning a complete response with respect to a server which requests a write process;
storing the data that is written in the first recording medium to the first recording exclusive buffer asynchronously to the write process that writes the data to the first recording medium by referring to the buffer index table;
judging whether a region of the first recording medium to which a next write process is to write first arbitrary data overlaps a region of the first recording medium that is written with second arbitrary data to be stored to the first recording exclusive buffer but that has not yet been stored to the first recording exclusive buffer, when the next write process is requested from the server while the data that is written in the first recording medium is being stored from the first recording medium to the first recording exclusive buffer;
storing the data written in the first recording medium to the first recording exclusive buffer with priority by putting the next write process on wait if the overlap exists;
in the first storage apparatus, collectively transmitting the data within the first recording exclusive buffer to the second storage apparatus if the first recording exclusive buffer is full, or a predetermined time elapses from a time of storage of the data that is written in the first recording medium to the first recording exclusive buffer;
in the second storage apparatus, storing the data received from the first storage apparatus to one or a plurality of second recording exclusive buffers within the second storage apparatus; and
in the second storage apparatus, collectively developing the data within the one or the plurality of second recording exclusive buffers to a second recording medium at a copy destination if reception of the data from the first storage apparatus is completed.

* * * * *